US011685129B2

(12) United States Patent
Juarez et al.

(10) Patent No.: US 11,685,129 B2
(45) Date of Patent: Jun. 27, 2023

(54) METHOD AND DEVICES TO CONSTRUCT ARTIFICIAL INLINE DEFECTS TO CALIBRATE INSPECTION HARDWARE ON AUTOMATED FIBER PLACEMENT SYSTEMS

(71) Applicant: UNITED STATES OF AMERICA AS REPRESENTED BY THE ADMINISTRATOR OF NASA, Washington, DC (US)

(72) Inventors: Peter D. Juarez, Hampton, VA (US); Elizabeth D. Gregory, Hampton, VA (US)

(73) Assignee: UNITED STATES OF AMERICA AS REPRESENTED BY THE ADMINSTRATOR OF NASA, Washington, DC (US)

( * ) Notice: Subject to any disclaimer, the term of this patent is extended or adjusted under 35 U.S.C. 154(b) by 279 days.

(21) Appl. No.: 17/112,442

(22) Filed: Dec. 4, 2020

(65) Prior Publication Data

US 2022/0176651 A1    Jun. 9, 2022

(51) Int. Cl.
| | | |
|---|---|---|
| *B29C 70/38* | (2006.01) | |
| *B29C 70/54* | (2006.01) | |
| *G01N 21/88* | (2006.01) | |
| *G01N 21/93* | (2006.01) | |
| *G01N 21/84* | (2006.01) | |

(52) U.S. Cl.
CPC .......... *B29C 70/382* (2013.01); *B29C 70/545* (2013.01); *G01N 21/8851* (2013.01); *G01N 21/93* (2013.01); *G01N 2021/8472* (2013.01); *G01N 2021/8874* (2013.01)

(58) Field of Classification Search
CPC ..... B29C 70/38; B29C 70/382; B29C 70/384; B29C 70/386; B29C 70/388; B29C 70/545; B29C 66/02241; G01N 21/8851; G01N 21/93; G01N 2021/8874; G01N 2021/8472
See application file for complete search history.

(56) References Cited

U.S. PATENT DOCUMENTS

| | | | |
|---|---|---|---|
| 4,492,135 A * | 1/1985 | Ginn ...................... | B65H 5/062 271/271 |
| 7,171,033 B2 | 1/2007 | Engelbart et al. | |
| 2002/0141632 A1* | 10/2002 | Engelbart ............. | G06T 7/0004 382/141 |

(Continued)

OTHER PUBLICATIONS

Juarez et al. "Advances in In Situ Inspection of Automated Fiber Placement Systems", Proceedings of SPIE, May 11, 2016, Thermosense: Thermal Infrared Applications XXXVIII, pp. 986109-1-8, vol. 9861, Baltimore, MD, United States.

*Primary Examiner* — George R Koch
(74) *Attorney, Agent, or Firm* — M. Bruce Harper; Robin W. Edwards; Trenton Roche

(57) ABSTRACT

Systems, methods, and devices are provided for the creation of predictable and accurate defects in a fiber tow of an Automated Fiber Placement (AFP) process, with such artificial defects being useful to support calibration of an in situ inspection system used in the AFP process. Various embodiments include methods for creating such artificial defects that support calibration of an in situ inspection system of an AFP system or process. Various embodiments may also include a defect stencils for an AFP system or process.

20 Claims, 21 Drawing Sheets

(56) References Cited

U.S. PATENT DOCUMENTS

| | | | |
|---|---|---|---|
| 2005/0048273 A1* | 3/2005 | Ryan | B29C 44/322 |
| | | | 264/237 |
| 2006/0073311 A1* | 4/2006 | Hogg | B29C 70/545 |
| | | | 428/174 |
| 2017/0274604 A1* | 9/2017 | Kobayashi | B32B 27/26 |

* cited by examiner

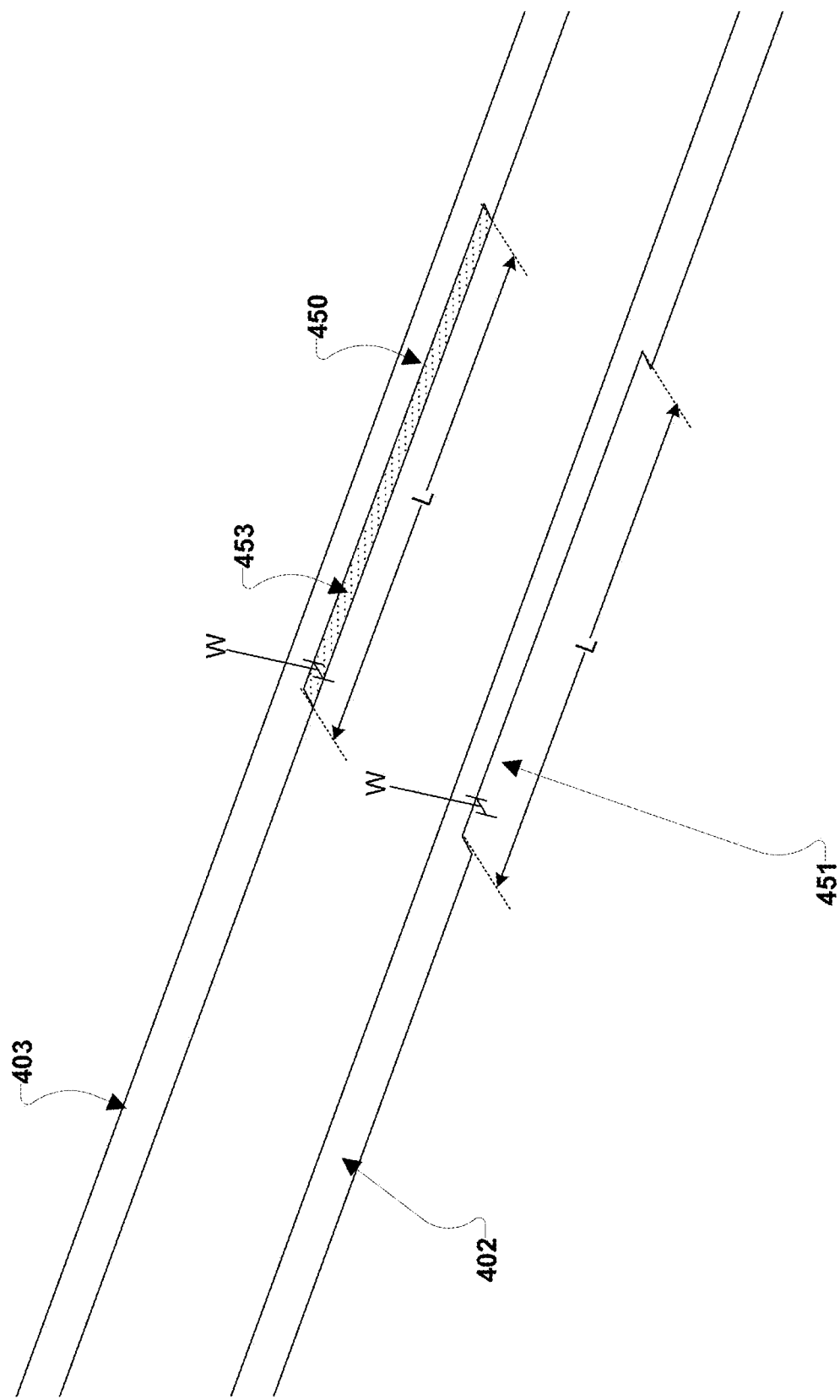

US 11,685,129 B2

METHOD AND DEVICES TO CONSTRUCT ARTIFICIAL INLINE DEFECTS TO CALIBRATE INSPECTION HARDWARE ON AUTOMATED FIBER PLACEMENT SYSTEMS

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Automated Fiber Placement (AFP) has seen wide spread adoption in the aerospace industry due to AFP's ability to rapidly construct large scale composite parts with very little scrap waste. AFP manufacturing is a method of constructing large scale composite structures by using robotic automation to place strips of carbon fiber prepreg, commonly referred to as tows, onto a tooling surface. The tows are often spool fed into a depositing head of an AFP system. The tows are lined up in a row side-by-side to be placed onto the tooling surface. This arrangement of side-by-side tows is called a course, and a course is placed on the tooling surface one course at a time. Multiple courses placed side-by-side make up a ply, and plies are deposited on top of each other to make the part.

AFP is prone to manufacturing defects caused by tow slippage, such as overlaps and gaps. Overlaps occur where one tow overlaps another tow. Gaps occur when a space is present between two tows. Studies show these defects can have a drastic effect on structural integrity of a part manufactured by AFP when the part is finished. In situ inspection systems have been developed to replace the laborious and time intensive manual inspection of each ply to find these defects in parts manufactured by AFP.

While in situ inspection is currently possible, there is no method to create accurate defects in an active AFP process to calibrate an in situ inspection system. Rather, the calibration methods that currently exist either: 1) are for out-of-process or post process inspection methods only and do not work for inspections during the layup (i.e., in situ inspections), or 2) rely on creating unpredictable defects and identifying and quantifying them post layup to compare to the data of ideal parts.

BRIEF SUMMARY OF THE INVENTION

Methods and devices of the various embodiments may enable creating predictable and accurate artificial defects in a fiber tow of an Automated Fiber Placement (AFP) process, to support calibration of an in situ inspection system for the AFP process. Various embodiments enable gap and/or overlap defects to be created with a known size, geometry, and location in an AFP system or course during layup of a composite part in an AFP process. The creation of the gap and/or overlap defects with known sizes, geometries, and locations may enable an in situ inspections system of an AFP system to be correctly calibrated and/or the precision of the in situ inspection system to be gauged.

Various embodiments may include a method for creating artificial defects in a tow for supporting calibration of an in situ inspection system of an AFP system. The method may include: selecting a length and a width of an artificial defect; selecting a defect stencil having a cut path corresponding to the selected length and width; and creating the artificial defect in a tow to be deposited in a course by the AFP system, wherein creating the artificial defect comprises cutting a portion of tow material using the selected defect stencil. The artificial defect may be a gap defect or an overlap defect.

In some method embodiments, the selected defect stencil may be in two parts, such as a stencil top and a stencil base, the stencil configured so that when they are placed on one another the tow material may be held in place. The cutting of a portion of tow material may involve using the selected defect stencil and passing a blade through an opening defined in the stencil top. The step of cutting a portion of tow material using the selected defect stencil may involve pressing a blade disposed in the stencil top through the tow material when the stencil top and the stencil base have been placed on one another. The step of selecting the length and the width of the artificial defect may involve selecting the length and the width of a gap defect and an overlap defect.

The cutting of the portion of tow material using the selected defect stencil may involve cutting a portion of a first tow of the course that is selected to receive the gap defect using the selected defect stencil; and the step of creating the artificial defect may further involve applying the portion of the first tow to a second tow of the course to create the overlap defect. The method may include depositing the first tow of the course and the second tow of the course by the AFP system to create an AFP build having the gap defect and the overlap defect, and imaging the AFP build using the in situ inspection system to detect the gap defect and the overlap defect. The method may involve calibrating the in situ inspection system based, at least in part, on the detection(s) of at least one gap defect and/or at least one overlap defect. Where the defect stencil is a two part defect stencil, then it may have a stencil top and a stencil base configured such that when placed on one another the first tow is held in place between the stencil top and the stencil base. The stencil top and the stencil base may have or define openings, such as a first and second openings, that are configured to form a cut path corresponding to the selected, desired, or predetermined length and width. The stencil top may include one or more blades that are configured to cut the first tow.

Various embodiments may include a defect stencil for creating artificial defects in a tow, the artificial defects supporting calibration of an in situ inspection system of an AFP system. Such a stencil may comprise: a stencil top; and a stencil base having or defining a first opening therein forming a cut path, wherein the stencil top and the stencil base are configured such that, when placed on one another with a tow of the AFP system in between, the stencil top and the stencil base hold the tow in place while the tow is cut along the cut path.

In some embodiments, the stencil top may have or define a second opening, with the second opening configured to align with the first opening in the base when the stencil top and the stencil base are placed on one another, and so as to receive a blade through the second opening to cut the tow along the cut path. In other embodiments, the stencil top may have one or more blades disposed therein, the one or more blades being configured to align with the first opening in the base and to cut the tow along the cut path when the stencil top and the stencil base are placed on one another.

The stencil base may further include a tow support protruding from a surface of the stencil base, and the width of the stencil base is greater than a width of the cut path. In some of those embodiments, the stencil top further comprises a tow gap configured to receive the tow support when the stencil top and the stencil base are placed on one another. The stencil base may include alignment protrusions configured to interact with sides of the stencil base when the stencil top and the stencil base are placed on one another.

These items may be formed using a variety of fabrication technologies and with a variety of materials, including for example, a stencil top and stencil base that are formed of plastic.

These and other features, advantages, and objects of the present methods and devices will be further understood and appreciated by those skilled in the art by reference to the following specification, claims, and appended drawings.

BRIEF DESCRIPTION OF THE SEVERAL VIEWS OF THE DRAWINGS

FIGS. 4A-4F illustrate example operations to create a gap defect and an overlap defect using a defect stencil in accordance with various embodiments.

DETAILED DESCRIPTION OF THE INVENTION

Figure 3A:
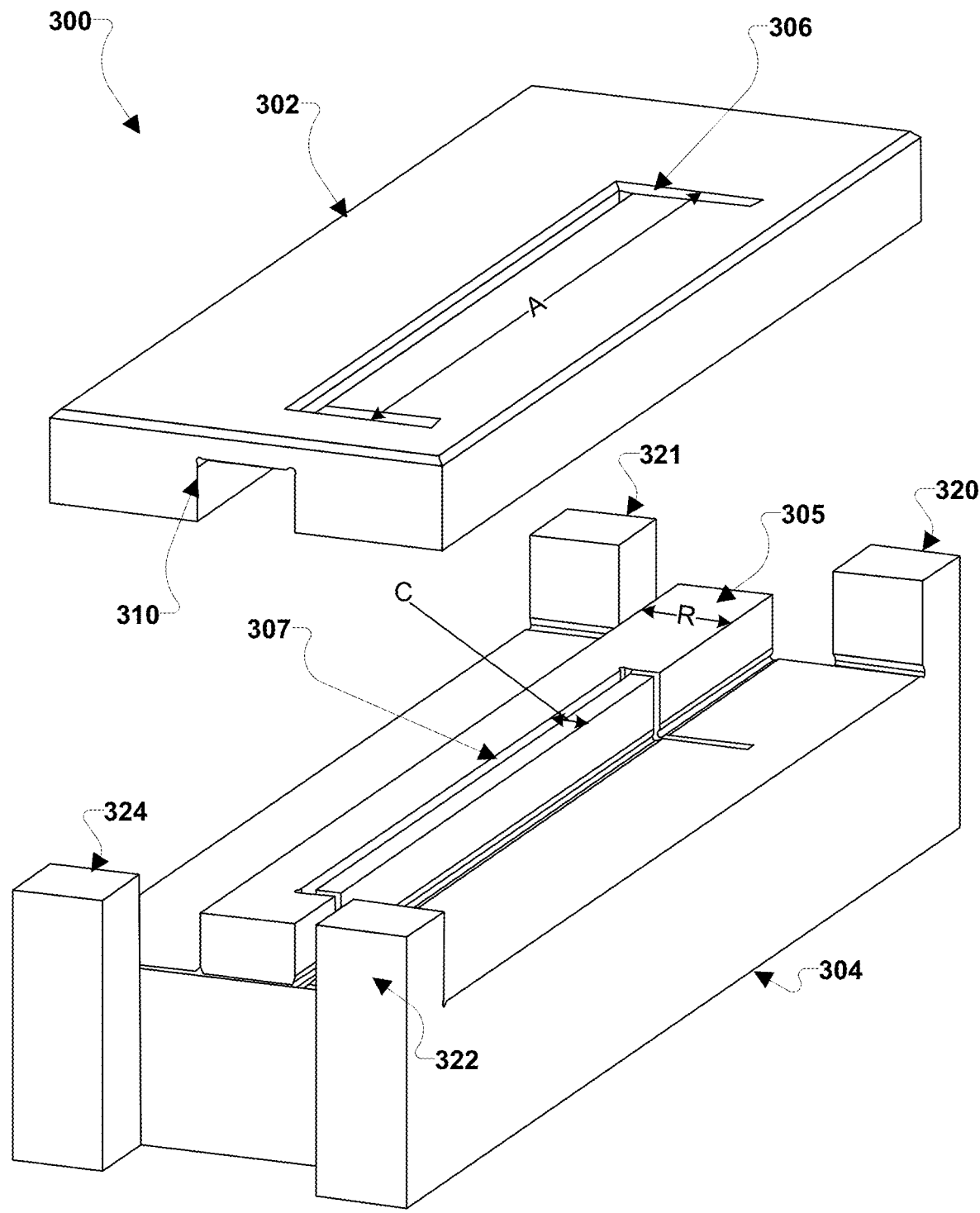
FIGS. 3A-3D are schematic diagrams showing aspects of a defect stencil in accordance with various embodiments.

For purposes of description herein, the terms "upper," "lower," "right," "left," "rear," "front," "vertical," "horizontal," and derivatives thereof shall relate to the invention as oriented in FIG. 3A. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, a computing device as discussed herein may include any electronic device that includes a processor and executes application programs.

While Automated Fiber Placement (AFP) has seen wide spread adoption, the location and extent of tow overlaps and gaps cannot be predicted during layup and therefore it is difficult to create a calibration procedure for in situ inspection systems meant to find overlaps and gaps during an AFP build.

Systems, methods, and devices of the various embodiments may enable creating predictable and accurate artificial defects in an Automated Fiber Placement (AFP) process to support calibration of an in situ inspection system for the AFP process. Embodiments may simulate two types of AFP defects: tow overlaps (also referred to as "overlap defects" or merely "overlaps"); and tow gaps (also referred to as "gap defects" or merely "gaps"). These simulated AFP defects may be artificial defects in the various embodiments created in an AFP machine to support calibration of an in situ inspection system. The systems, methods, and devices of the various embodiments discussed herein have been proven to accurately place artificial overlap and gap defects in a part during layup. To the inspection system, the artificial overlap and gap defects may be indistinguishable from real overlap and gap defects. As such, these artificial overlap and gap defects can only be distinguished from an actual defect when one tries to manually correct the defect. The artificial overlap and gap defects continue to act like a real defect throughout the build, so effects of multiple stacking defects can also be observed, according to various embodiments. Embodiments may provide a controllable method for creating artificial defects in AFP processes that may be incorporated into a standard for certifying and calibrating in situ inspection systems, such as an American Society For Nondestructive Testing (ASNT) standard, an American Society for Testing and Materials (ASTM) standard, etc.

In various embodiments, to create a course with an artificial gap between a pair of tows, a cutting apparatus, such as a defect stencil, may be used to cut off a precisely controlled section of tow before it is fed into the AFP machine and/or before the tow is aligned or otherwise collimated with other tows in the AFP machine to form a course. In various embodiments, the location in the length of tow and size of the cut is controlled and recorded to determine where in the course and final part the gap will present itself. When the AFP machine lines up and lays down the tows in the course, the reduced-width tow will present as a measured gap in between the tows.

In various embodiments, the creation of a course with an artificial overlap over the tows is similar to the method of creating a gap. To form an overlap, the section of tow that is cut off and removed using the cutting apparatus, such as a defect stencil, may not be discarded. Instead, the small section of removed tow may be re-applied to the edge of another tow. In various embodiments, the location in the length of tow and size of the added material is controlled and recorded to determine where in the course and final part the overlap will present itself. When the AFP machine lines up and lays down the tows in the course, the tow with the added material will present as a measured overlap of tows because it is now double the thickness of the pristine or unmodified tows.

In various embodiments, cutting apparatuses, such as defect stencils, may be fabricated in any manner. As one example, a cutting mold (or stencil) that securely holds the tow in place and has openings to insert a cutting blade to cut the tow may be manufactured (e.g., via three-dimensional (3D) printing, cast molding, routing, etc.) As another example, the cutting apparatus may also have cutting blades build in, so to enable clamping the tow in place and cutting the tow is one action. In various embodiments, the spacing and length of the cutting slots may be precisely controlled so that the overlap and/or gap has an exact or desired width or length.

Figure 1A:
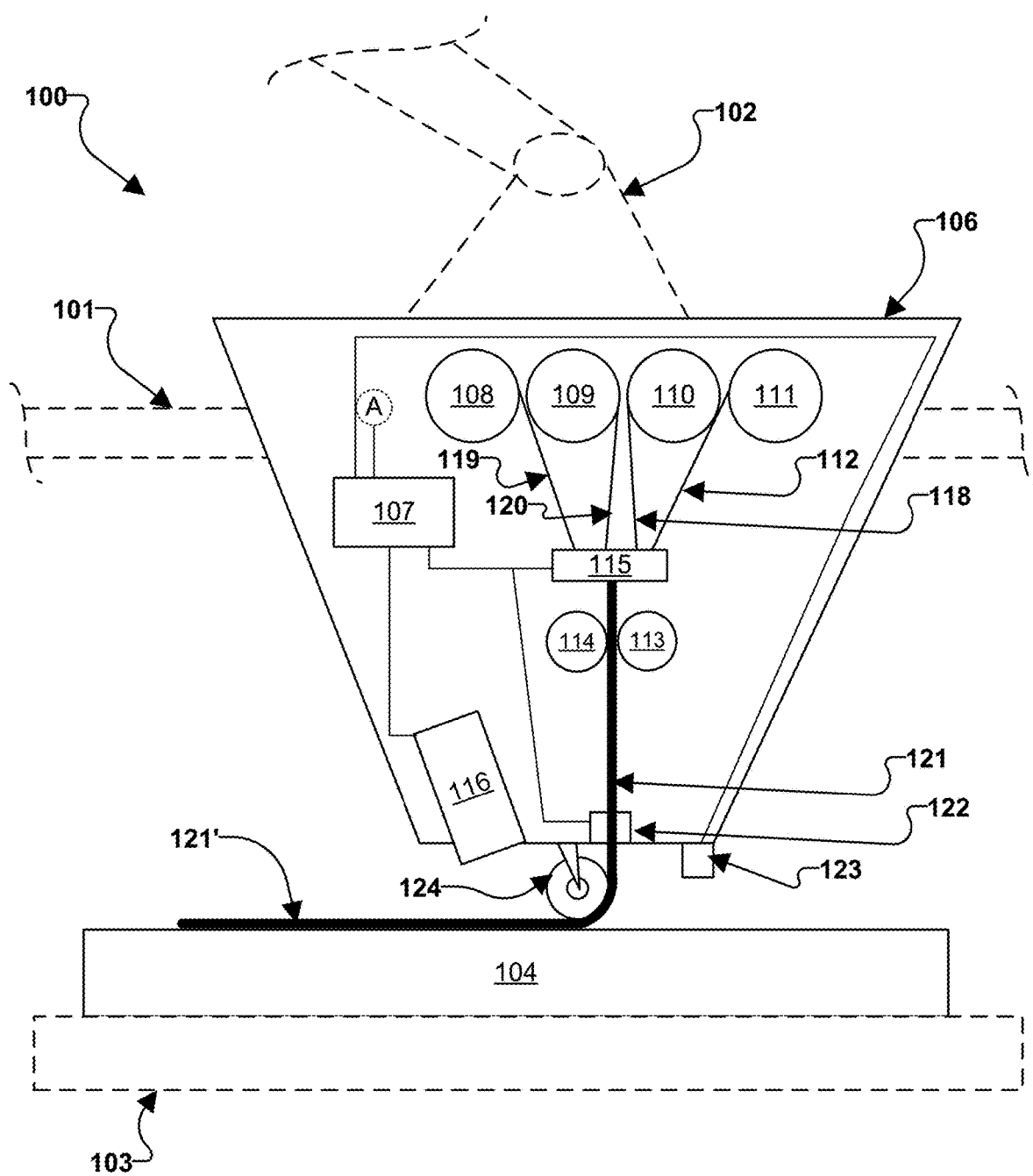
FIG. 1A is a block diagram of an Automated Fiber Placement (AFP) system including an in situ inspection system suitable for use with various embodiments.
Figure 1A:
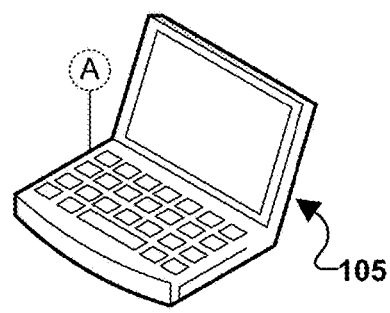

FIG. 1A is a block diagram of an AFP system 100 including an in situ inspection system 116 suitable for use with various embodiments. The illustration of the AFP system 100 in FIG. 1A is a simplified version of an AFP system, and one of ordinary skill in the art will understand an AFP system suitable for use with various embodiments may include more or fewer components than shown in FIG. 1A, and may operate differently than the AFP system 100 illustrated.

In general, the AFP system 100 may include an AFP head (also sometimes referred to as an "AFP machine") 106 that receives tows or tow tapes 119, 120, 118, and 112 (left to right) that are aligned in the AFP head 106 side-by-side into a course 121 that is deposited and compacted onto a substrate 104 to form a laid-down course 121'. The substrate 104 may operate as a mold for a part to be built up by the repeated depositing of laid-down courses 121' by the AFP head 106. In some configurations, the AFP head 106 may be stationary and the substrate 104 may be supported on an optional moving support 103 (e.g., a translatable platform, rotating spindle, etc.). In some configurations, the AFP head 106 may be mounted on a moving system, such as an optional robotic arm 102 and/or optional gantry system 101, and translate relative to the substrate 104 that remains stationary. In some configurations, the AFP head 106 may be mounted on a moving system as before, such as an optional robotic arm 102 and/or optional gantry system 101, and translate relative to the substrate 104, but where the substrate 104 may be supported on an optional moving support 103 (e.g., a translatable platform, rotating spindle, etc.) such that both the AFP head 106 and the substrate 104 may move, including movement relative to one another.

In operation, tows (or tow tapes) 119, 120, 112, and 118 may be feed from spools 108, 109, 111, and 110, respectively. While illustrated as within the AFP head 106, the spools 108, 109, 111, and 110 may be located outside the AFP head 106. While illustrated as including four tows (or tow tapes) 119, 120, 112, and 118, the AFP system 100 may include any number of two or more tows (or tow tapes), such as 2, 3, 4, 5, 6, 7, or more, etc., tows (or tow tapes). The tows (or tow tapes) 119, 120, 112, and 118 may be fiber tape strips, such as epoxy fiber tape strips, carbon fiber tape strips, carbon fiber epoxy tape strips, etc. The tows (or tow tapes) 119, 120, 112, and 118 may be aligned side-by-side into the course 121 by one or more alignment components, such as a collimator 115 and/or rollers 114, 113. Optionally, the AFP head 106 may include a pre-heater 123 (e.g., a lamp, resistive heater, etc.) configured to heat the surface of the substrate 104 and/or previously deposited courses 121' as the new course 121 is deposited out of the AFP head 106 and/or a head heater 122, such as a resistive heater, lamp, etc., configured to heat the course 121 before it is deposited out of the AFP head 106. The pre-heater 123 and/or head heater 122 may increase tackiness of the course 121 and reduce slippage of the course 121 during deposition. The AFP head 106 may include a compaction component, such as a compaction roller 124, compaction foot, compaction lip, etc., that travels along the substrate 104 and/or previously deposited courses 121' to deposit the tows (or tow tapes) 119, 120, 112, and 118 forming the course 121 onto the substrate 104 and/or previously deposited courses 121'.

As illustrated in FIG. 1A, the AFP system 100 may include an in situ inspection system 116 housed in and/or on the AFP head 106. As an example, the in situ inspection system 116 may include one or more imagers, such as thermal imagers (e.g., infrared cameras, etc.), optical imagers (e.g., optical cameras, etc.), etc., to image the build surface as the courses 121 are deposited by the AFP head 106. The in situ inspection system 116 may be connected to controller 107, such as a processor, microcontroller, etc., configured to control the operations of the in situ inspection system 116 and/or components of the AFP head 106, such as the collimator 115, pre-heater 123, and/or head heater 122. The controller 107, and/or the in situ inspection system 116 itself, may be connected to a computing device 105 of the AFP system 100, such as via one or more wired and/or wireless connection. The computing device 105 may be configured to output images or other results of the inspections performed by the in situ inspection system 116 and/or control the operations of the in situ inspection system 116, the controller 107, and/or the AFP head 106 components (e.g., the collimator 115, pre-heater 123, and/or head heater 122). As a specific example, the computing device 105 may be configured to calibrate the in situ inspection system 116 and/or determine the precision of the in situ inspection system 116 based at least in part on the detection of artificial defects of a known size, geometry, and location by the in situ inspection system 116 in accordance with various embodiments.

Figure 1B:
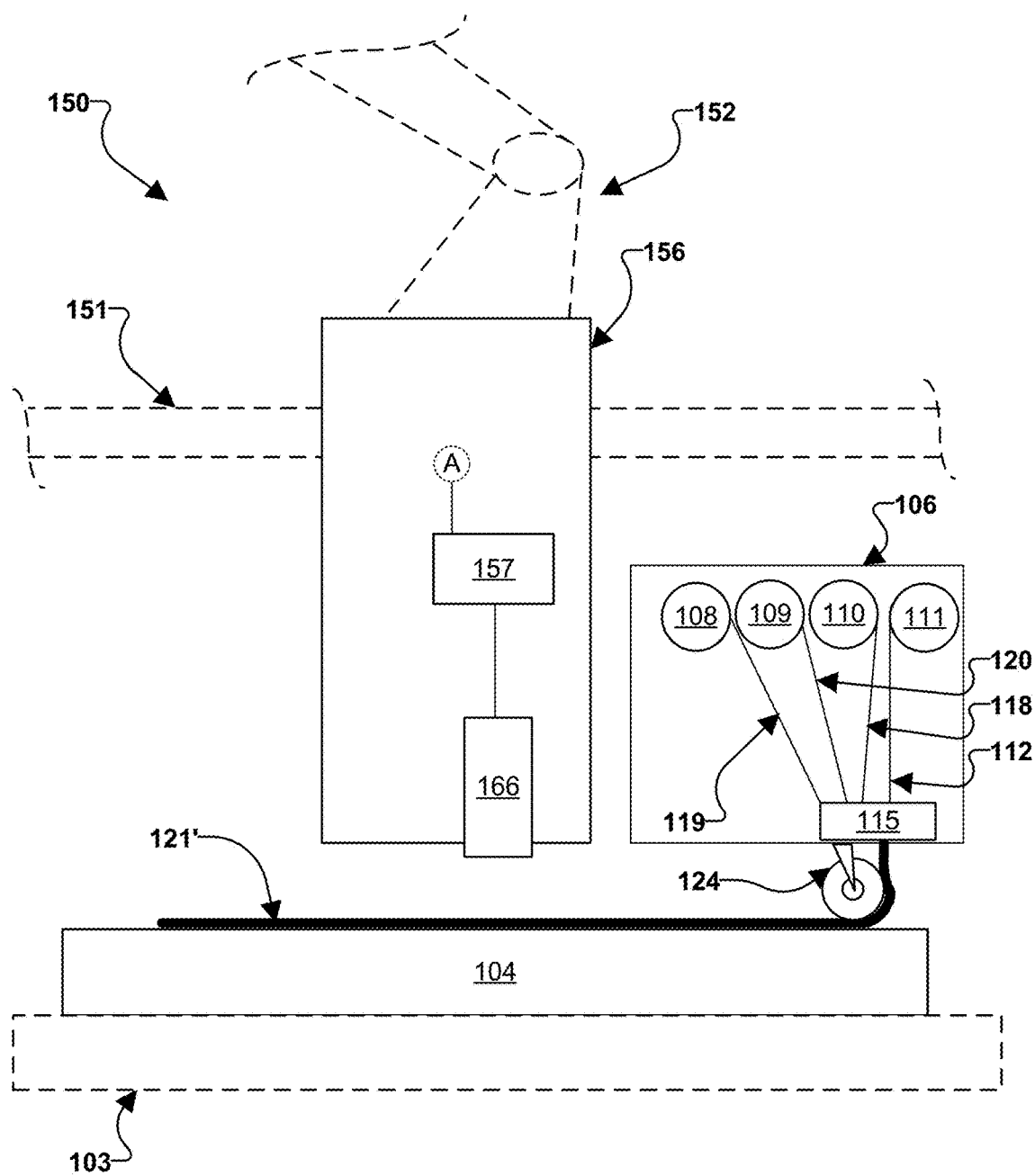
FIG. 1B is a block diagram of another AFP system including an in situ inspection system suitable for use with various embodiments.
Figure 1B:
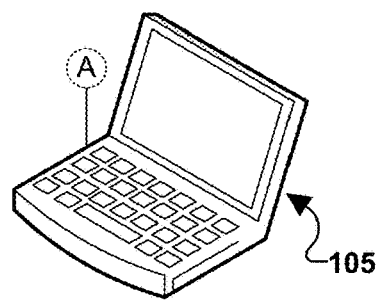

FIG. 1B is a block diagram of another AFP system 150 including an in situ inspection system 156 suitable for use with various embodiments. The AFP system 150 of FIG. 1B may be similar to AFP system 100 of FIG. 1A, except that in the AFP system 150, the in situ inspection system 156 may be a separate component from the AFP head 106. The illustration of the AFP system 150 in FIG. 1B is a simplified version of an AFP system, and one of ordinary skill in the art will understand an AFP system suitable for use with various embodiments may include more or less components than shown in FIG. 1B and may operate differently than the AFP system 150 illustrated in FIG. 1B. Additionally, for ease of illustration, various components of the AFP head 106 are not redrawn in FIG. 1B, such as the pre-heater 123, head heater 122, rollers 113, 114, controller 107, etc. An optional moving system such as robotic arm 152 and/or optional gantry 151 are shown with respect to in situ inspection system 156 separate from AFP head 106. An optional moving system, such as an optional robotic arm 102 and/or optional gantry system 101, to translate the AFP head 106 are not redrawn in FIG. 1B. However, such components may be present in the AFP system 150—i.e., as discussed with reference to AFP head 106 and illustrated in, FIG. 1A.

In some configurations, the in situ inspection system 156 may be stationary and the substrate 104 may be supported on optional moving support 103 (e.g., a translatable platform, rotating spindle, etc.) In some configurations, the in situ inspection system 156 may be mounted on a moving system, such as an optional robotic arm 152 and/or optional gantry system 151, and translate relative to a substrate 104 that remains stationary. In some configurations, the in situ inspection system 156 may be mounted on a moving system, such as an optional robotic arm 152 and/or optional gantry system 151, and translate relative to the substrate 104, and substrate 104 may be supported on an optional moving support 103 (e.g., a translatable platform, rotating spindle, etc.) such that both the in situ inspection system 156 and the substrate 104 may move relative to one another. The in situ inspection system 156 may be positioned so as to observe the deposited course 121' as the deposited course 121' exits from under the compaction roller 124.

As illustrated in FIG. 1B, the in situ inspection system 156 may include one or more imagers 166, such as thermal imagers (e.g., infrared cameras, etc.), optical imagers (e.g., optical cameras, etc.), to image the build surface as the courses 121 are deposited by the AFP head 106. The imagers 166 may be connected to controller 157, such as a processor, microcontroller, etc., configured to control the operations of the imagers 166. The controller 157, and/or the one or more imagers 166, may be connected to a computing device 105 of the AFP system 150, via one or more wired, wireless, or similar connection. The computing device 105 may be configured to output images or other results of the inspections performed by the in situ inspection system 156 and/or control the operations of the in situ inspection system 156. As a specific example, the computing device 105 may be configured to calibrate the in situ inspection system 156 and/or determine the precision of the in situ inspection system 156 based at least in part on the detection of artificial defects of a known size, geometry, and location by the in situ inspection system 156, in accordance with various embodiments.

Figure 2A:
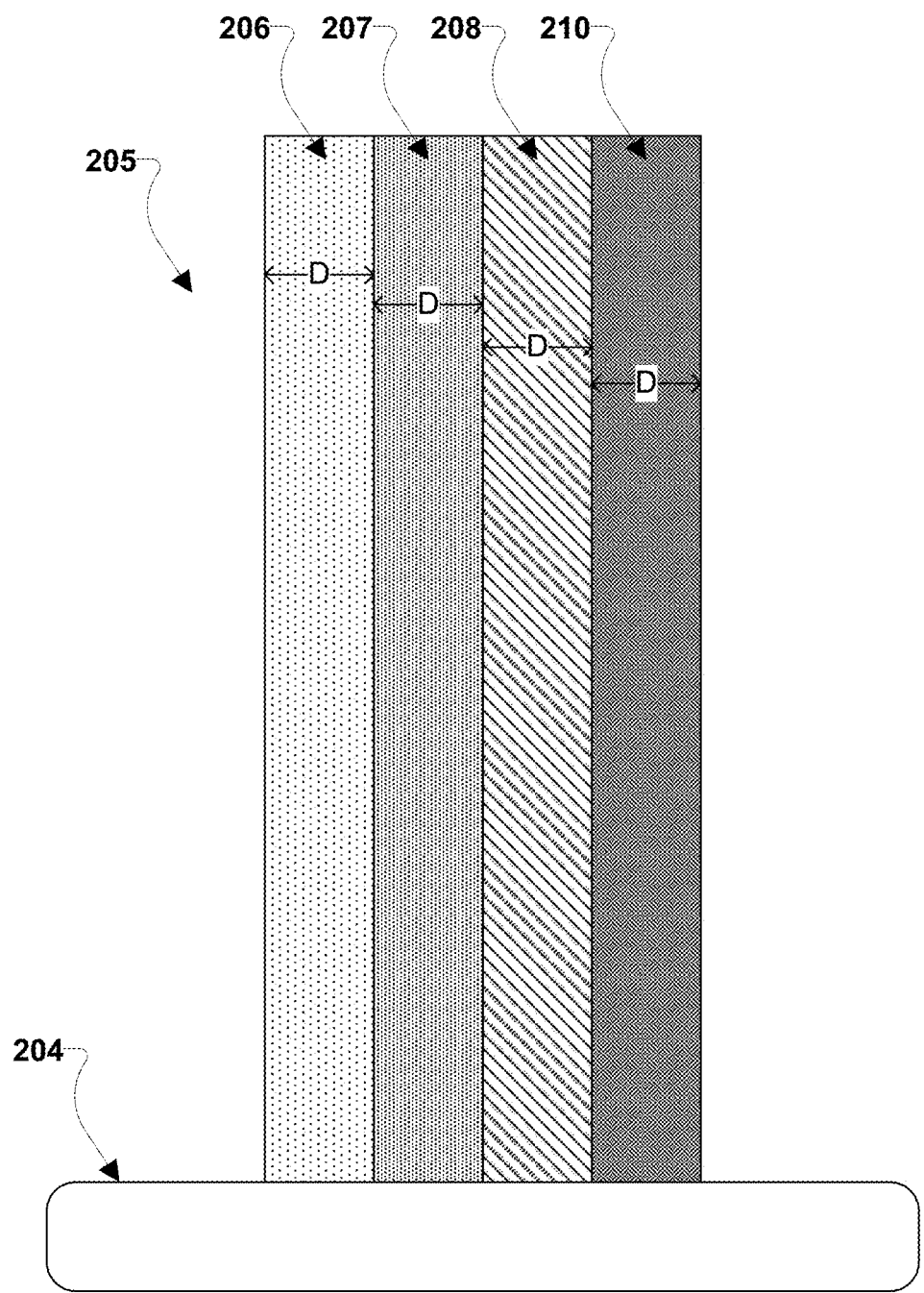
FIG. 2A illustrates examples of tows lined up side-by-side in a course without any gap or overlap defects.
Figure 2B:
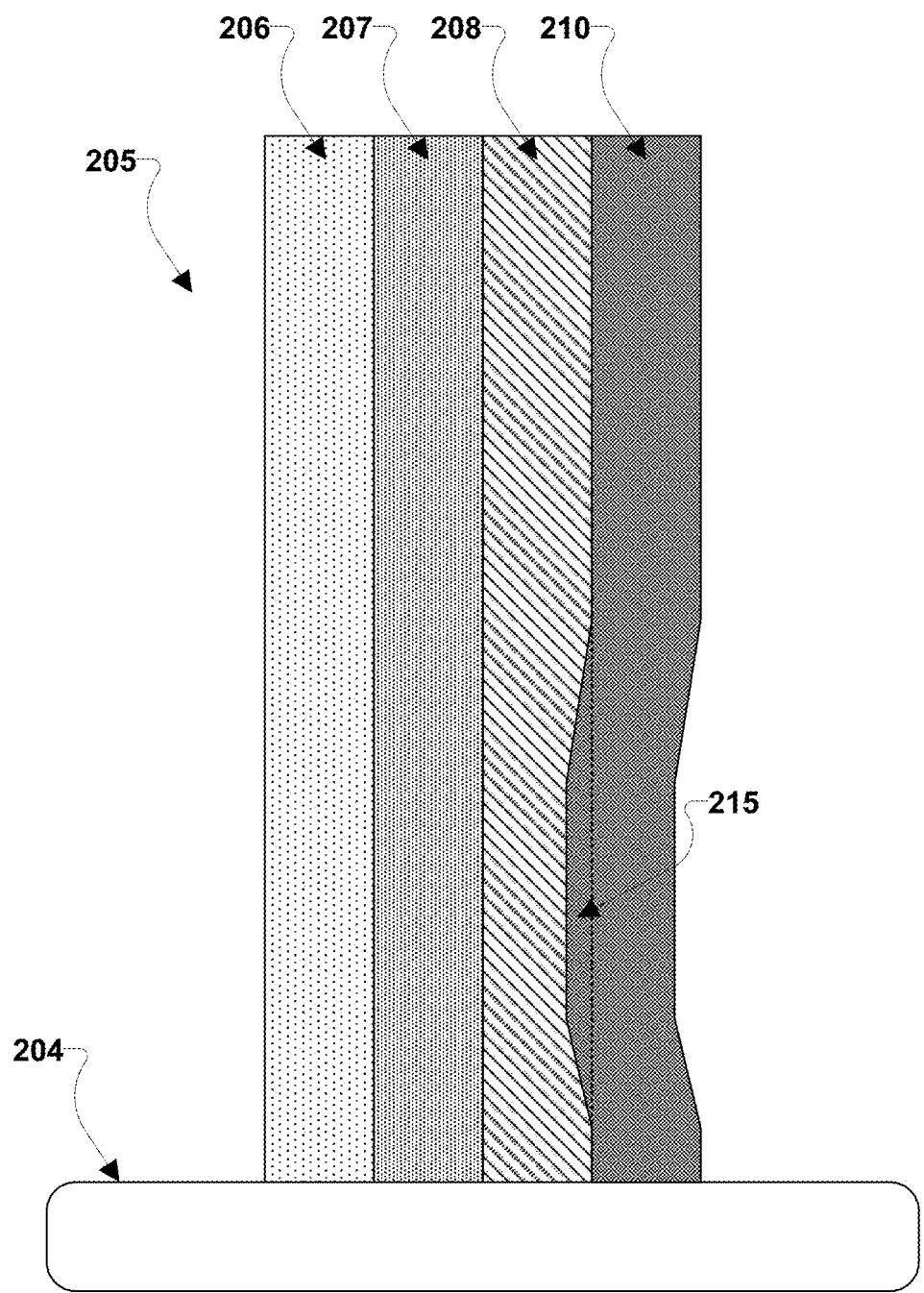
FIG. 2B illustrates examples of tows lined up side-by-side in a course showing an example overlap defect.
Figure 2C:
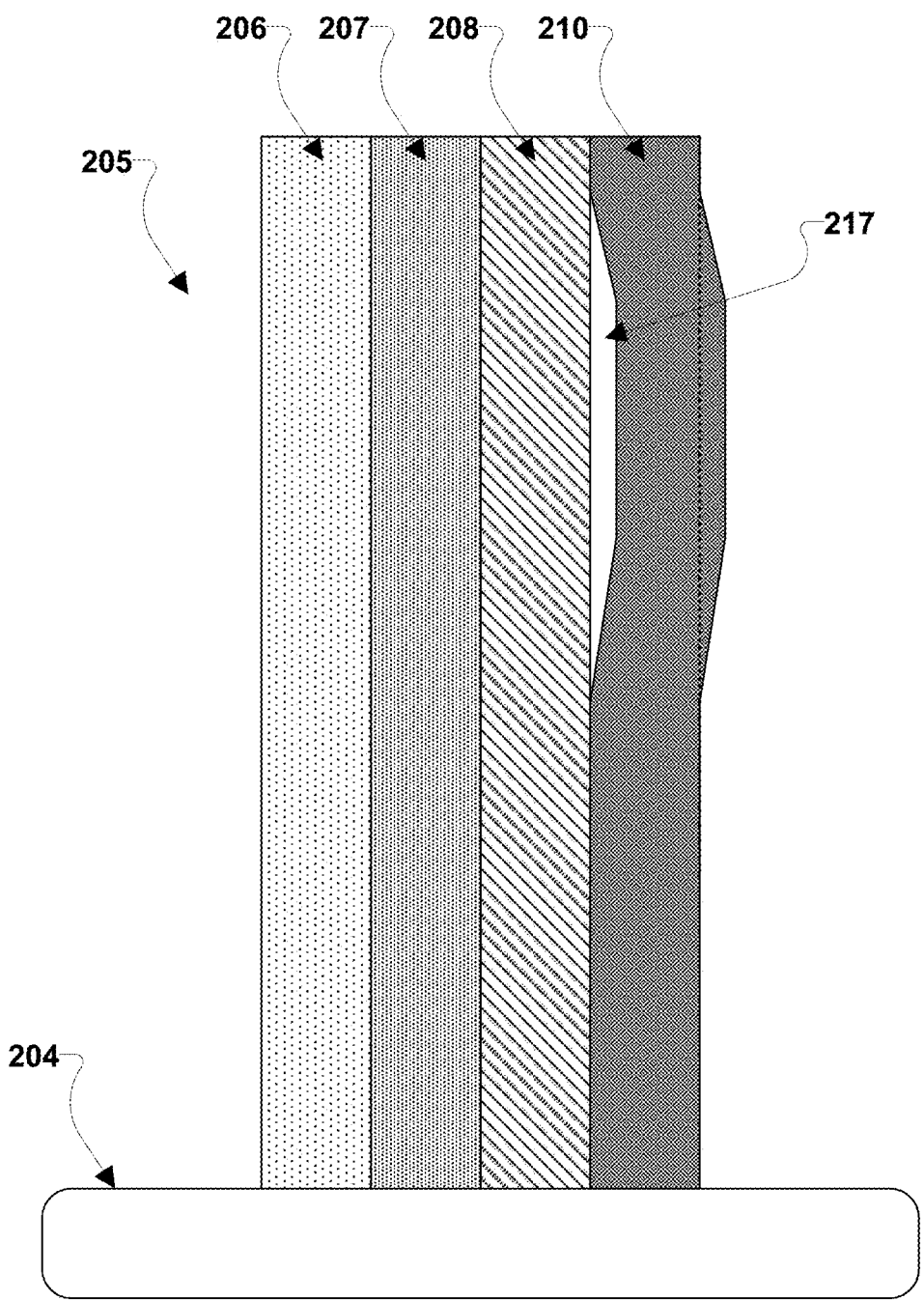
FIG. 2C illustrates examples of tows lined up side-by-side in a course showing an example gap defect.

FIGS. 2A, 2B, and 2C illustrate illustrates examples of tows 206, 207, 208, 210 in a course 205. The course 205 may exit from a compaction component, such as a compaction roller 204. The course 205 may be an example of a deposited course 121' laid down by AFP system 100 or 150.

FIG. 2A illustrates examples of tows 206, 207, 208, 210 lined up side-by-side in the course 205 without any gap or overlap defects. As illustrated in FIG. 2A, the tows 206, 207, 208, 210 may be of equal diameter "D" and may be aligned side-by-side in the course 205 such that there are no gaps or overlaps present in the course.

FIG. 2B illustrates examples of tows 206, 207, 208, 210 lined up side-by-side in the course 205 showing an example overlap defect 215. As illustrated in FIG. 2B, during deposition of the tow 210, the tow 210 partially overlapped the tow 208 creating an overlap defect 215. The overlap defect 215 may be created by tow slippage.

FIG. 2C illustrates examples of tows 206, 207, 208, 210 lined up side-by-side in the course 205 showing an example gap defect 217. As illustrated in FIG. 2C, during deposition of the tow 210, the tow 210 partially separated from the tow 208 creating a gap defect 217. The gap defect 217 may be created by tow slippage.

Figure 3B:
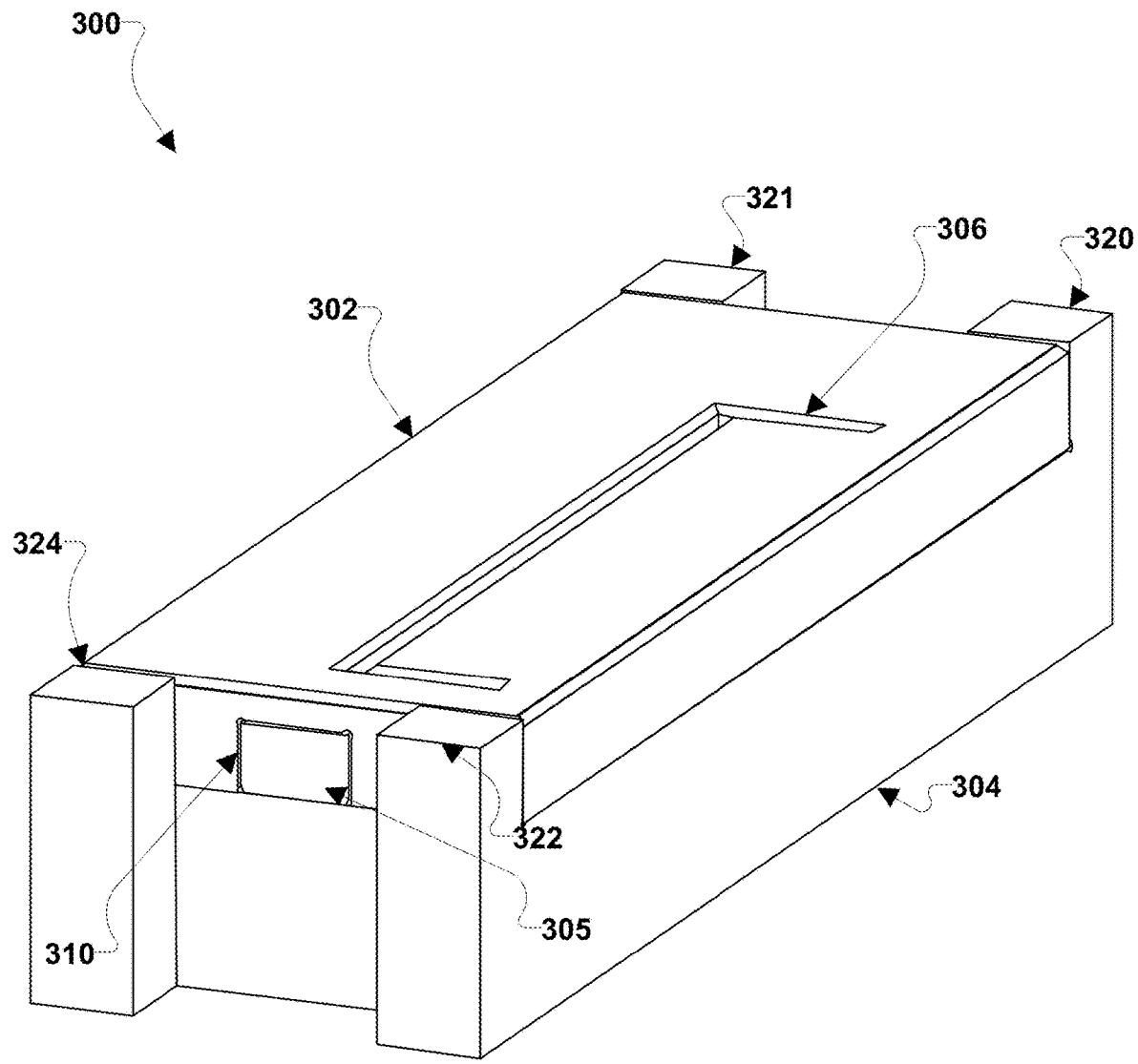
Figure 3C:
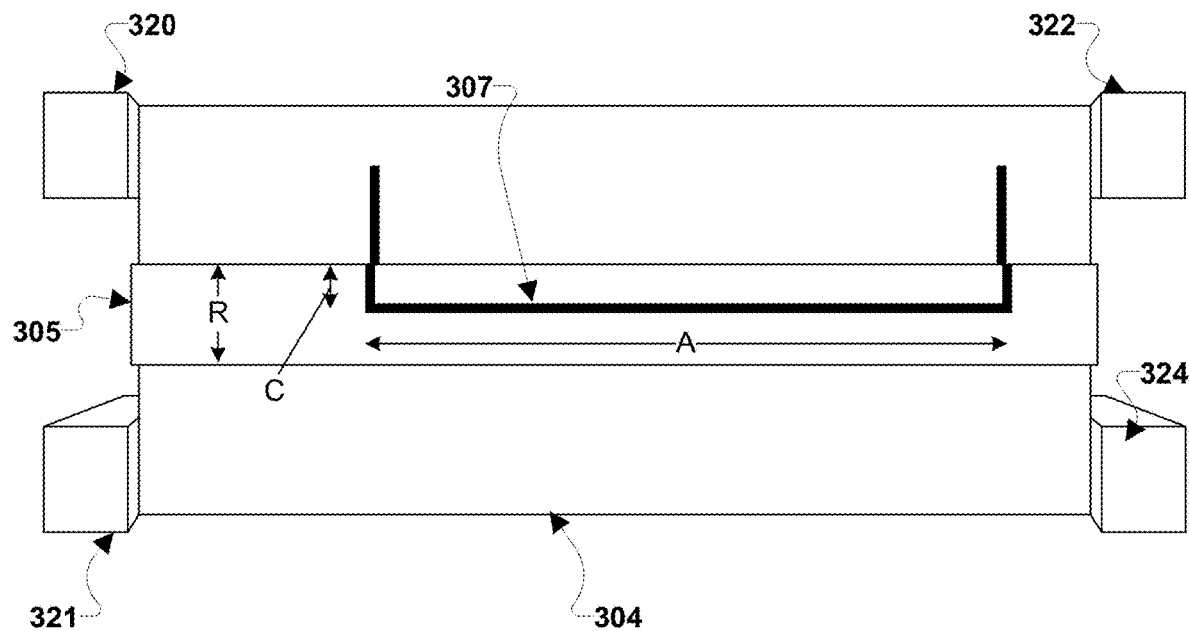
Figure 3D:
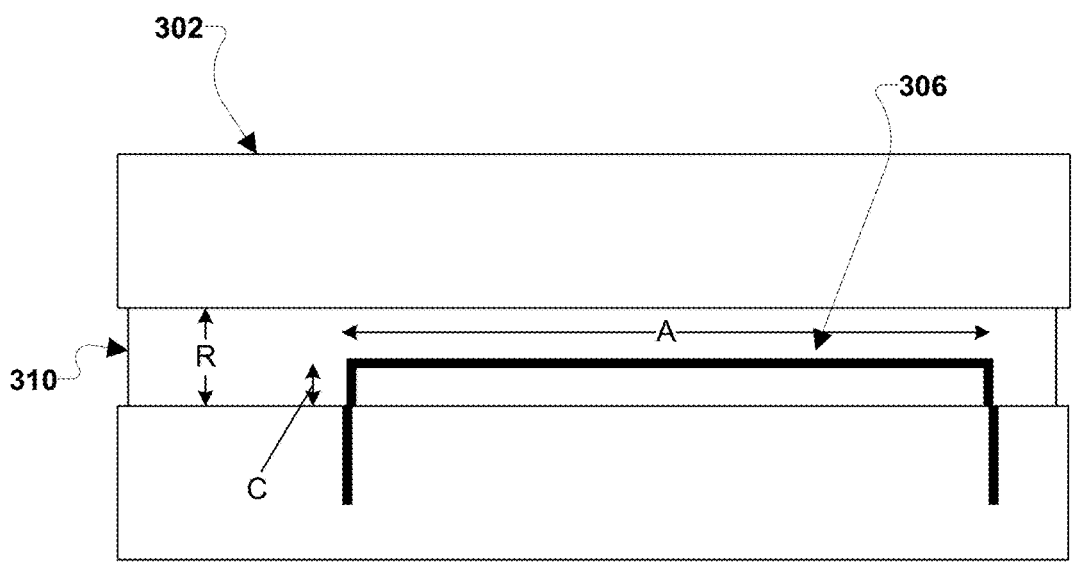

FIGS. 3A, 3B, 3C, and 3D are schematic diagrams showing aspects of a defect stencil 300 in accordance with various embodiments. The defect stencil 300 may be a cutting apparatus configured to securely hold a tow in place and may have or define first opening 307 and second opening 306 in which to insert a cutting blade to cut the tow to a selected or predetermined size and geometry, such as a selected length and width rectangle cut of the tow. While FIGS. 3A, 3B, 3C, and 3D illustrate a specific example of one configuration of openings 306 and 307 of the defect stencil 300, the size and relative alignments of the openings 306 and 307 may be changed to provide defect stencils capable of making overlap and/or gap defects of different widths and lengths. FIG. 3A illustrates the defect stencil 300 in a separated configuration where a stencil top 302 is separated from a stencil base 304. FIG. 3B illustrates the defect stencil 300 in its operating configuration with the stencil top 302 aligned over the stencil base 304. FIG. 3C illustrates and overhead view of the stencil base 304. FIG. 3D illustrates an underside view of the stencil top 302.

With reference to FIGS. 3A, 3B, 3C, and 3D, the defect stencil 300 may include or be embodied in two components, the stencil top 302 and the stencil base 304. The stencil top 302 and/or stencil base 304 may be formed from various materials, such as plastic, metal, wood, etc. The material of which the stencil top 302 and/or stencil base 304 may be selected such that the stencil top 302 and/or stencil base 304 are rigid and do not deform in repeated use. The stencil top 302 and/or stencil base 304 may be manufactured in various manners. As a specific example, the stencil top 302 and/or stencil base 304 may be 3D printed. The stencil base 304 may be configured to receive the stencil top 302.

The stencil base 304 may be configured to align with the stencil top 302 to securely hold a tow in place when the stencil top 302 is placed on top of the stencil base 304. The stencil base 304 may include alignment features, such as in this example, four alignment protrusions 320, 321, 322, and 324 (e.g., pillars, tabs, etc.), that are configured to interact with edges of the stencil top 302 to align the openings 306 and 307 when the stencil top 302 is placed on top of the stencil base 304. In an alternative configuration, the stencil top 302 may include alignment features.

The stencil base 304 may include a tow support 305 protruding from a surface of the stencil base 304. The tow support 305 may have a width "R" corresponding to the width of a tow to be cut by the defect stencil 300. The tow support 305 may be configured to fit within a tow gap 310 of the stencil top 302 when the stencil top 302 is placed on top of the stencil base 304. The tow support 305 may interact with one side of a tow and the tow gap 310 may interact with the opposite side of the tow to hold the tow in place in the defect stencil 300 when the stencil top 302 is placed on top of the stencil base 304 to thereby encase the tow. In some embodiments, the stencil top 302 may lock into place over the stencil base 304.

The first and second openings 307 and 306 may be configured to extend a distance "C" in toward the center of the tow support 305 and a distance "A" along a length of the tow support 305. The distance "A" may correspond to a length of a cut along the tow to be created using the defect stencil 300. The distance "C" may correspond to a width of a cut along the tow to be created using the defect stencil 300. The distance "C" may be offset to compensate for a cutting blade size such that a final size of a cut portion of the tow when cut by the blade matches a selected width for the cut tow portion. For example, in a scenario in which a blade with a double bevel were the cutting point is centered in the width of the blade is used, the distance "C" may be offset to compensate for the distance from the edge of the blade to the cutting tip of the blade to ensure accurately sized final cuts of the cut tow portion. The distance "C" may be a distance less than the width of the tow and less than the width "R" of the tow support 305. The second opening 306 may pass entirely through the depth of the stencil top 302. The first opening 307 may extend a depth below the surface of the stencil base 304. The first and second openings 307 and 306 may be configured such that when the stencil top 302 is placed on top of the stencil base 304, a blade passed through and along the openings 306 and 307 may cut a portion of a tow within the defect stencil 300 to have a length corresponding to the distance "A" and a width corresponding to the distance "C". The cut path of the blade may correspond to the openings 306 and 307. In this manner, while a portion of a tow may be cut using the defect stencil 300, the entire tow may not be severed and the tow may remain usable in a course.

Figure 4A:
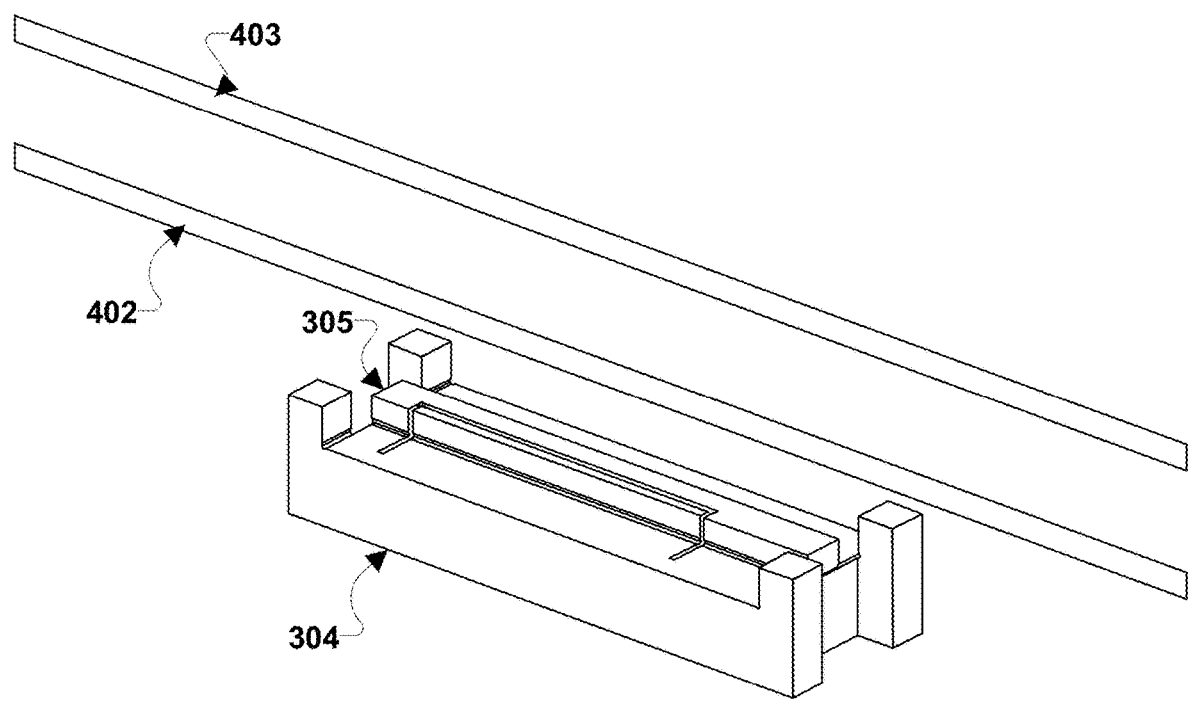

FIGS. 4A, 4B, 4C, 4D, 4E, and 4F illustrate examples of operations to create artificial defects, specifically a gap defect and an overlap defect, using the embodiments shown in defect stencil 300 of FIGS. 3A-3D. FIG. 4A shows the stencil base 304 aligned below a tow 402 or a group of tows 402 and 403 that will form a course. For example, the tows 402 and 403 may be tows 206, 207, 208, 210, 112, 118, 119, 120 and/or courses 121 and/or 205 as discussed above. As an example, tow 402 may be a tow selected to receive a gap defect and tow 403 may be selected to receive an overlap defect. While discussed in terms of a tow receiving a gap defect and a tow receiving an overlap defect, gap defects may be created independently of overlap defects. For example, a gap defect may be cut using the stencil 300 without a corresponding overlap defect being made. As another example, a separate piece of tow material may be cut using stencil 300 to create an overlap defect without cutting any actual tows of a course to be deposited. The tows 402 and 403 may be portions of the tows in an AFP machine, such as AFP head 106, portions of tows outside an AFP machine, such as portions of tows between a tow spool (e.g., spools 108, 109, 110, 111) and an AFP head 106 before the tows pass into the AFP head 106, or portions of tows before the tows are placed on the spools (e.g., spools 108, 109, 110, 111) themselves. As a specific example, the tows 402 and 403 may be portions of tows extended between spools (e.g., spools 108, 109, 110, 111) and a collimator (e.g., collimator 115) before the tows 402 and 403 are aligned side-by-side to form a course.

Figure 4B:
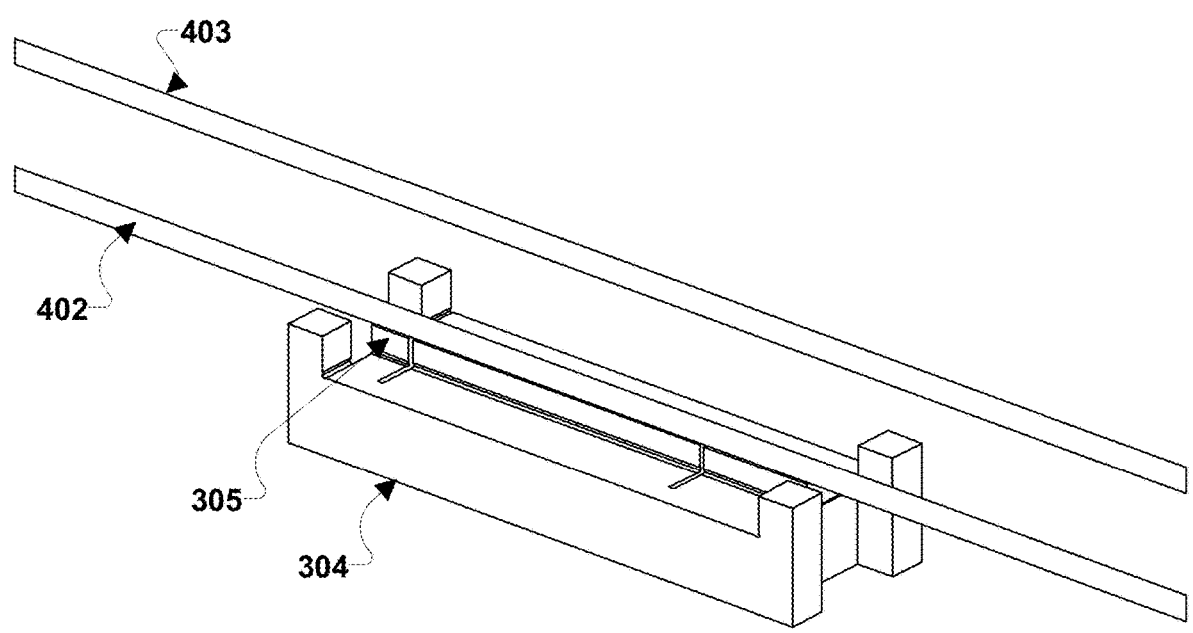

FIG. 4B shows the stencil base 304 brought into contact with an underside of the tow 402 such that the tow 402 aligns with the tow support 305. The position of the stencil base 304 may be at a location along the length of the tow 402 that is measured, or otherwise known, such that the position of the resulting artificial defect (e.g., the gap defect and the overlap defect) in the build when the tows 402 and 403 are laid down will be known.

Figure 4C:
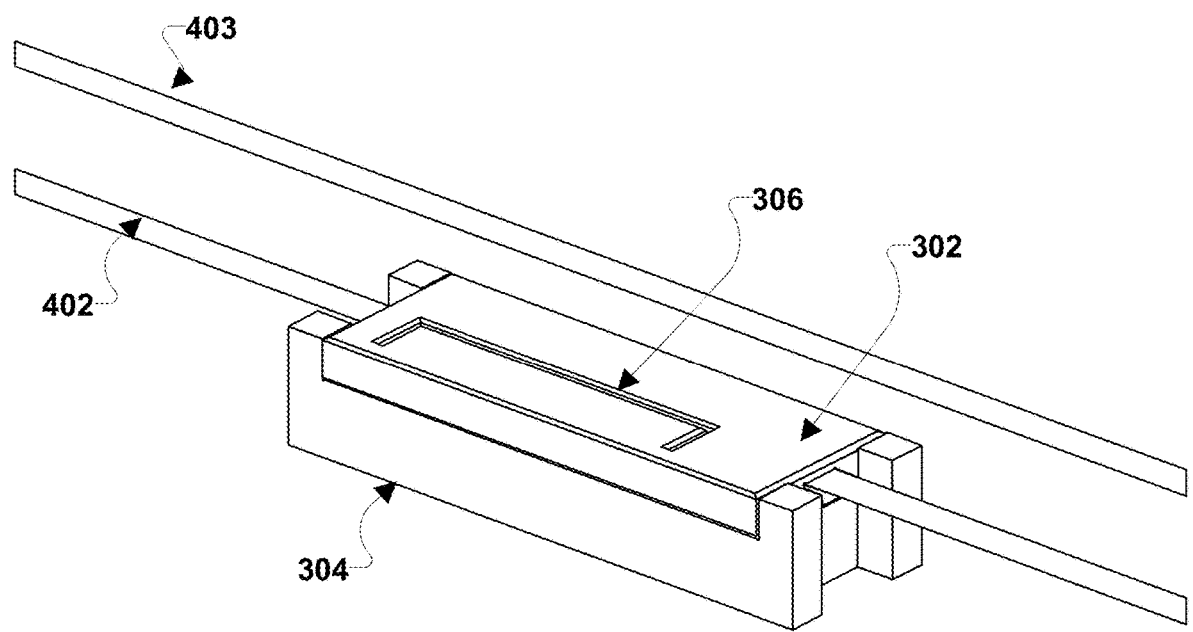

FIG. 4C shows the stencil top 302 attached to the stencil base 304, securing the two portions of the defect stencil 300 together over the tow 402. The first and second openings 306 and 307 (not shown) may be aligned with one another with the tow 402 held therebetween.

Figure 4D:
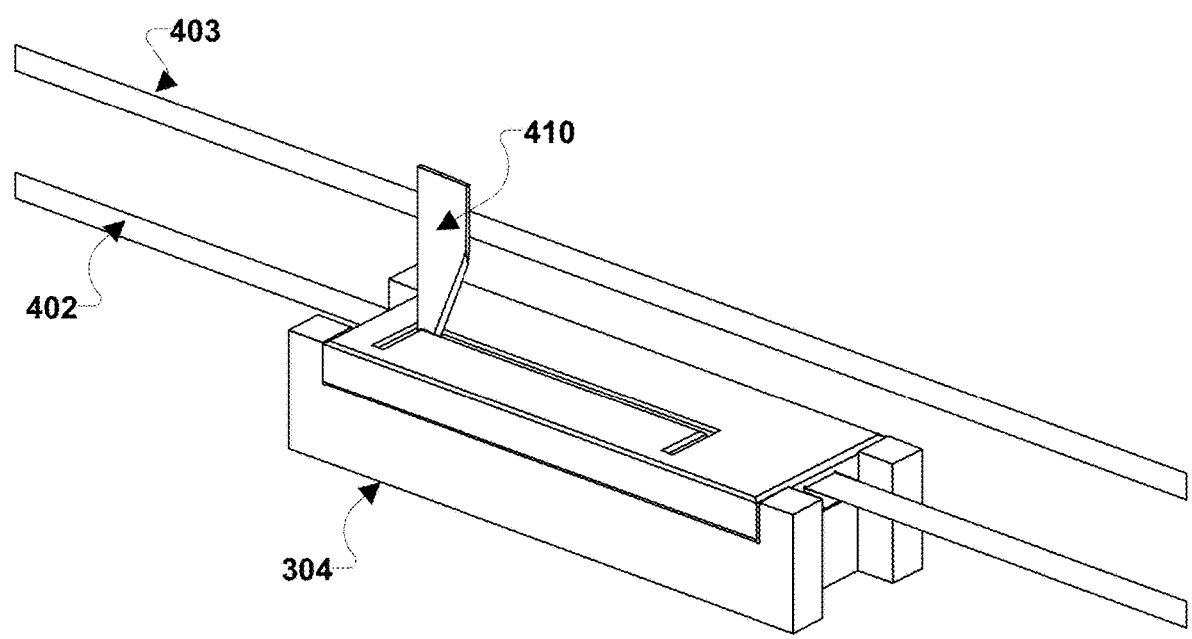
Figure 4E:
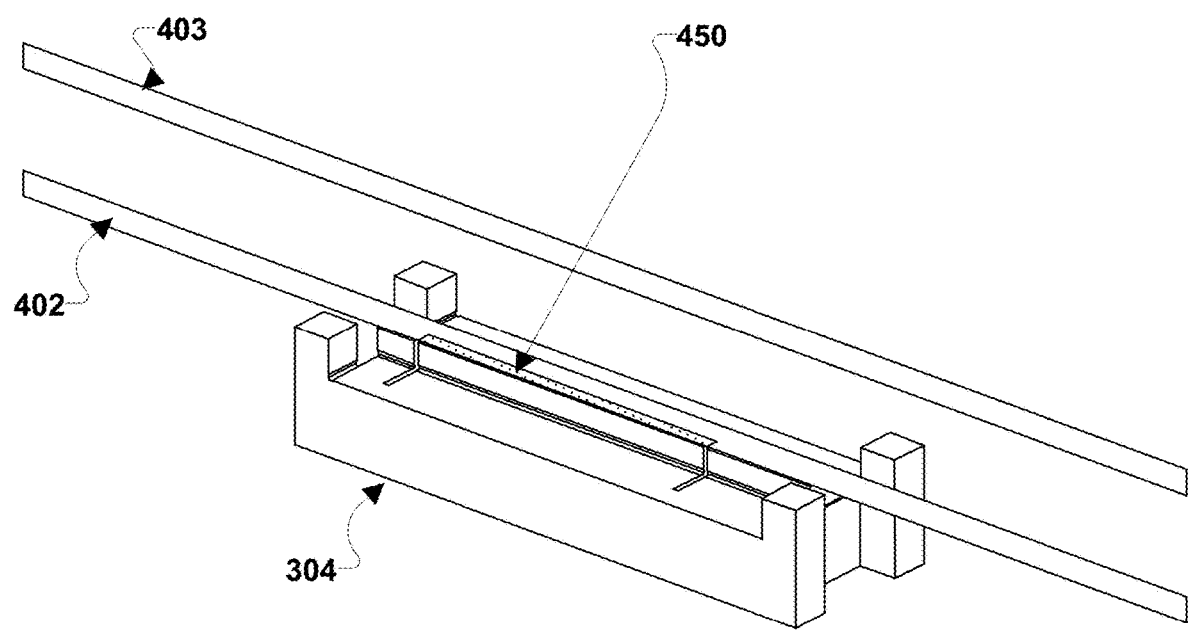

FIG. 4D shows the tow 402 being cut by a blade 410 being inserted into the opening 306. The blade 410 may be inserted into the top or second opening 306 with sufficient force to pierce the tow 402 and pass at least partially into the base or first opening 307 (inter-relation of first and second openings 307 and 306 depicted in FIG. 3A.) The blade 410 may be moved along the cut path of the openings 306 and 307 to cut out a portion of the tow 402, such as portion 450 illustrated in FIG. 4E. The cut out portion of the tow 402 may have a length and a width defined by the cut path and selected to give an artificial defect a specific selected length and width. FIG. 4E shows the stencil top 302 removed from the stencil base 304 exposing the cut portion 450 of the tow 402.

While FIGS. 4A-4E illustrate one orientation of the stencil base 304 relative to the tow 402, the orientation of the stencil base 304 may be rotated 180 degrees such that the opening 307 aligns with the opposite edge of the tow 402. By such rotation, the stencil 300 may be used to create gap defects in the tow 402 extending into the tow 402 from either edge of the tow 402. The orientation of the defect stencil 300 may be selected as appropriate to insert a gap on a desired edge of the tow 402.

FIG. 4F shows the cut portion 450 of the tow 402 removed from the tow 402 and applied (e.g., glued, frictionally attached, heat sealed, etc.) to the tow 403 at the edge of the tow 403 to create an artificial defect, specifically an overlap defect 453. The removal of the cut portion 450 of the tow 402 also creates an artificial defect, specifically a gap defect 451 in the tow 402. While illustrated on one edge of the tow 403, the cut portion 450 of the tow 402 may be adhered aligned with the opposite edge of the tow 403 to create an overlap defect at the opposite edge. The gap defect 451 and the overlap defect 453 may have a length "L" corresponding to the distance "A" of the defect stencil 300. The gap defect 451 and/or the overlap defect 453 may have a width "W" corresponding to the distance "C" of the defect stencil 300 or corresponding to a distance of nearly the distance "C" of the defect stencil 300 differing from the distance "C" by an offset corresponding to a blade 410 size (see, e.g., A and C shown in FIG. 3C.)

Figure 5A:
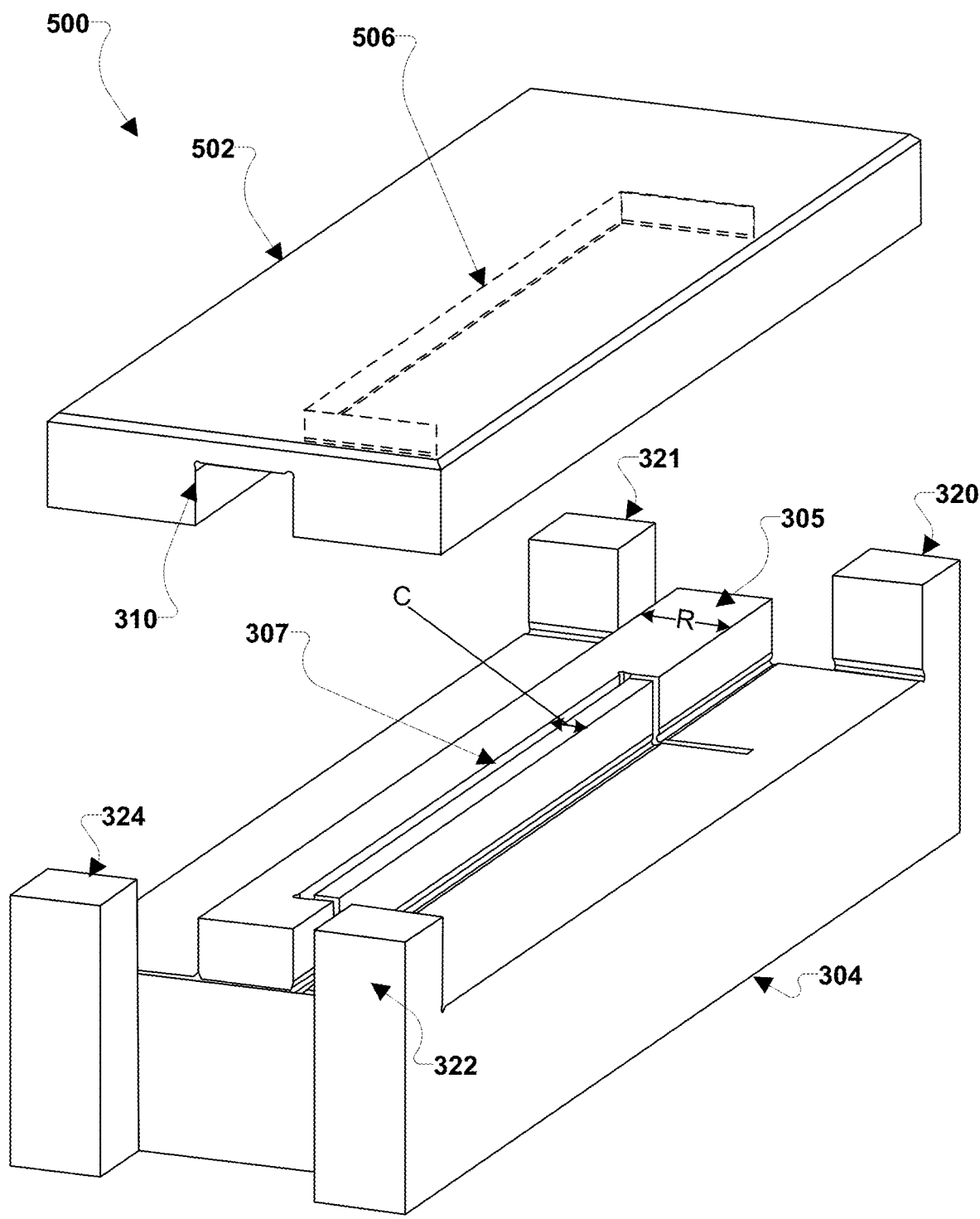
FIGS. 5A-5D are schematic diagrams showing aspects of another defect stencil in accordance with various embodiments.
Figure 5B:
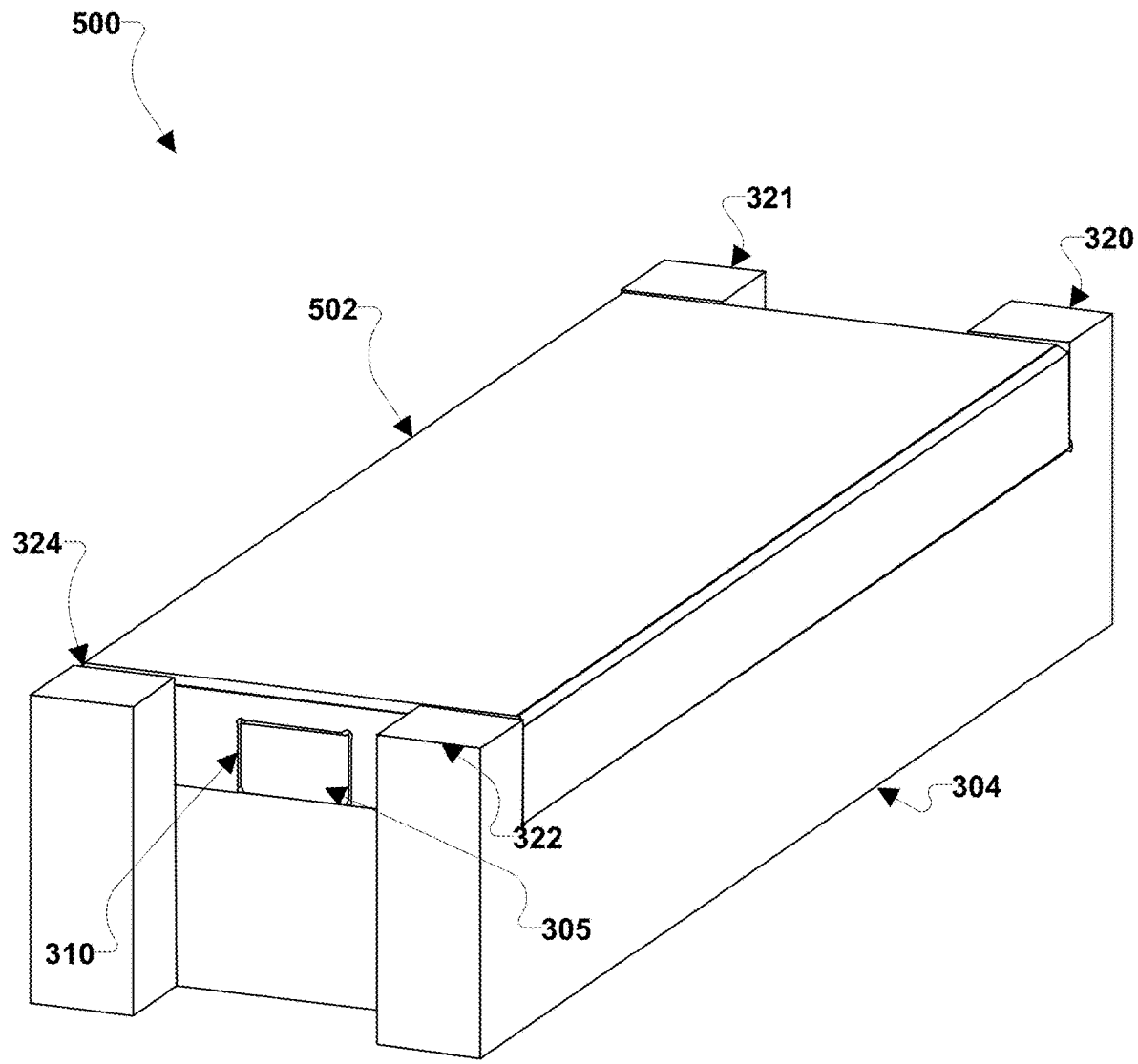
Figure 5C:
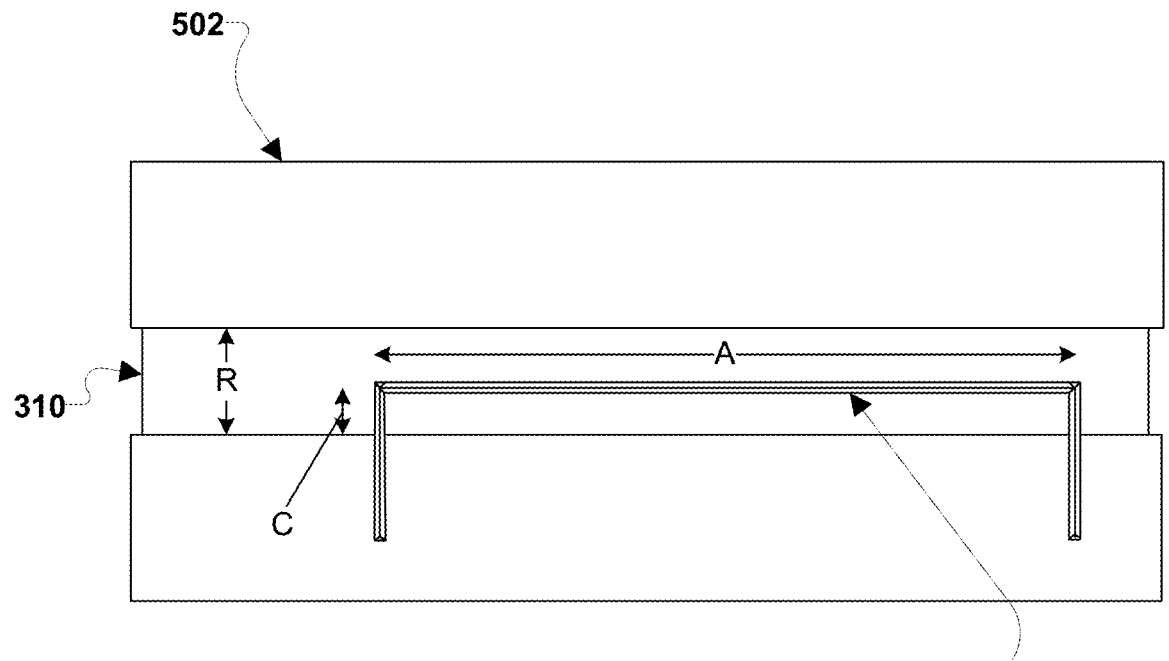
Figure 5D:
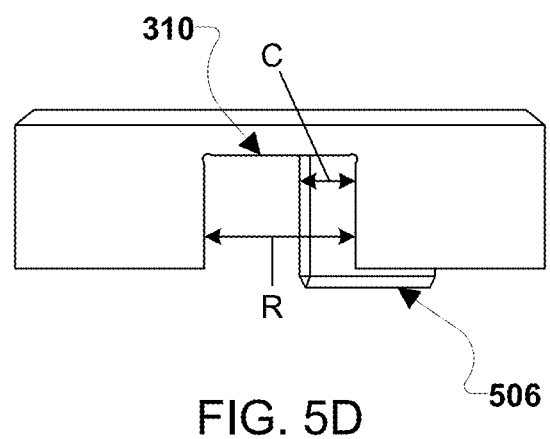

FIGS. 5A-5D are schematic diagrams showing aspects of an alternative defect stencil 500 in accordance with various embodiments. The defect stencil 500 may be similar to defect stencil 300, except that rather than defining opening 306 in the stencil top 302, the stencil top 502 of defect stencil 500 may include blades 506 attached to an underside of the stencil top 502. In this manner, unlike stencil 300 a separate blade, such as blade 410, may not be needed to cut tow 402; instead, merely bringing the stencil top 502 onto the stencil base 304 may cut a tow 402 (not shown), which may simply be positioned therebetween. The defect stencil 500 may be a cutting apparatus configured to securely hold a tow in place and to cut a tow to a selected size and geometry (e.g., a selected length and width rectangle cut.) While FIGS. 5A, 5B, 5C, and 5D illustrate a specific example of one configuration of blades 506 and first opening 307 of the defect stencil 500, the size and relative alignments of the blades 506 and the first opening 307 may be changed to provide defect stencils capable of making artificial defects, such as overlap and/or gap defects, of different widths and lengths. FIG. 5A illustrates the defect stencil 500 in a separated configuration where a stencil top 502 is separated from a stencil base 304. FIG. 5B illustrates the defect stencil 500 in its operating configuration with the stencil top 502 aligned over the stencil base 304. FIG. 5C illustrates an underside view of the stencil top 502. FIG. 5D illustrates a side view of the stencil top 502.

With reference to FIGS. 3A-5D, the defect stencil 500 may include the stencil top 502 and the stencil base 304. Similar to embodiments having the stencil top 302, the stencil top 502 may be formed from various materials, such as plastic, metal, wood, etc. The material of which the stencil top 502 and/or stencil base 304 may be selected such that the stencil top 502 and/or stencil base 304 are rigid and do not deform in repeated use. The stencil top 502 and/or stencil base 304 may be manufactured in various manners. As a specific example, the stencil top 502 and/or stencil base 304 may be 3D printed. Blades 506 may be mounted in the stencil top 502. The stencil base 304 may be configured to receive the stencil top 502.

The stencil base 304 may be configured to align with the stencil top 502 to securely hold a tow in place when the stencil top 502 is placed on top of the stencil base 304. The stencil base 304 may include alignment features, such as four alignment protrusions 320, 321, 322, and 324 (e.g., pillars, tabs, etc.), that are configured to interact with edges of the stencil top 502 to align the blades 506 and the opening 307 when the stencil top 502 is placed on top of the stencil base 304. In an alternative configuration, the stencil top 502 may include alignment features.

As discussed above (e.g., in reference to FIG. 5A), the stencil base 304 may include a tow support 305 protruding from a surface of the stencil base 304. The tow support 305 may have a width "R" corresponding to the width of a tow to be cut by the defect stencil 300. The tow support 305 may be configured to fit within a tow gap 310 of the stencil top 502 when the stencil top 502 is placed on top of the stencil base 304. The tow support 305 may interact with one side of a tow and the tow gap 310 may interact with the opposite side of the tow to hold the tow in place in the defect stencil 500 when the stencil top 502 is placed on top of the stencil base 304 to thereby encase the tow. In some embodiments, the stencil top 502 may lock into place over the stencil base 304. When the stencil top 502 is placed on top of the stencil base 304, the blades 506 may extend down into the openings 307 a distance below the surface of the stencil base 304.

The blades 506 and the opening 307 may be configured to extend a distance "C" in toward the center of the tow support 305 and a distance "A" along a length of the tow support 305. The distance "A" may correspond to a length of a cut along the tow to be created using the defect stencil 500. The distance "C" may correspond to a width of a cut along the tow to be created using the defect stencil 500. The distance "C" may be offset to compensate for the size of the blades 506 such that a final size of a cut portion of the tow when cut by the blades 506 matches a selected width for the cut tow portion. The distance "C" may be a distance less than the width of the tow and less than the width "R" of the tow support 305. The blades 506 and the opening 307 may be configured such that when the stencil top 502 is placed on top of the stencil base 304, the blades 506 pass through the openings 307 to cut a portion of a tow within the defect stencil 500 along the cut path formed by the opening 307. The blades 506 and the opening 307 may be configured such that when the stencil top 502 is placed on top of the stencil base 304, the blades 506 pass through the openings 307 to cut a portion of a tow within the defect stencil 500 to have a length corresponding to the distance "A" and a width corresponding to the distance "C". In this manner, while a portion of a tow may be cut using the defect stencil 500, the entire tow may not be severed and the tow may remain usable in a course.

Figure 6:
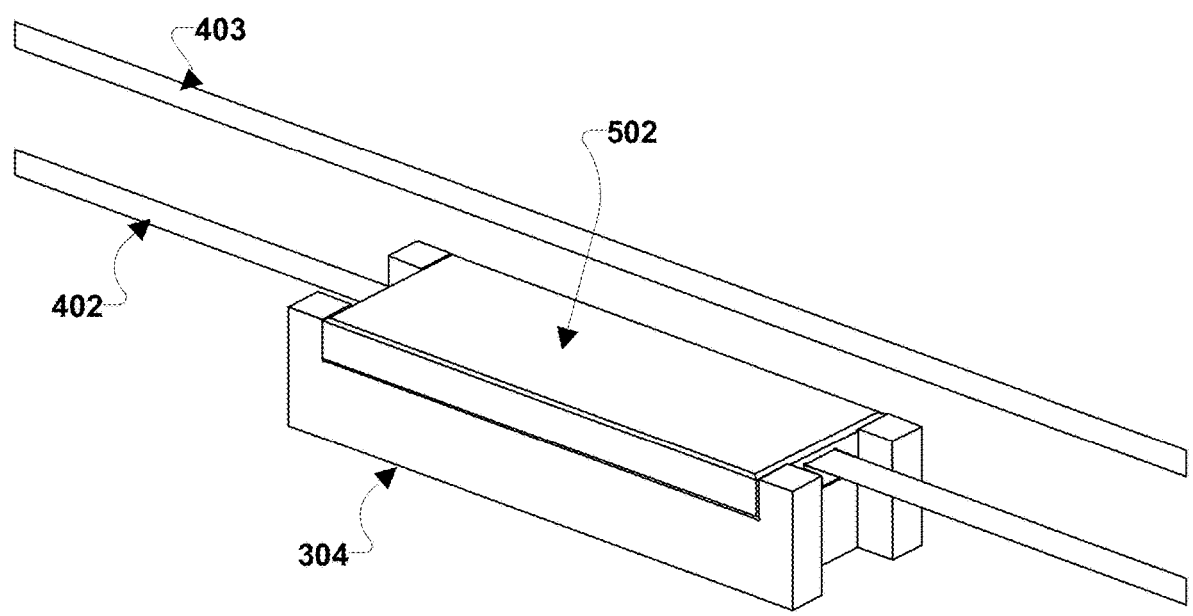
FIG. 6 illustrates another example operation to create a gap defect and an overlap defect using a defect stencil in accordance with various embodiments.

FIG. 6 illustrates another example of operation to create a gap defect and an overlap defect using an embodiment of the defect stencil 500. With reference to FIGS. 3A-6, the operation illustrated in FIG. 6 shows the stencil top 502 placed on the stencil base 304 in a similar manner as described with reference to FIG. 4C, and the stencil top 502 may be substituted for the stencil top 302, as shown in FIG. 6. As the stencil top 502 includes blades 506, the act of securing the stencil top 502 to the stencil base 304 may itself cause the cutting of the tow 402 to form the cut portion 450 of the tow 402 along the cut path formed by the blades 506 and opening 307. As such, when a stencil top 502 with blades 506 therein is used, the separate cutting step as illustrated in FIG. 4D may not be necessary. The operations as described with reference to FIGS. 4E and 4F may be performed once the stencil top 502 is removed from the stencil base 304.

Figure 7:
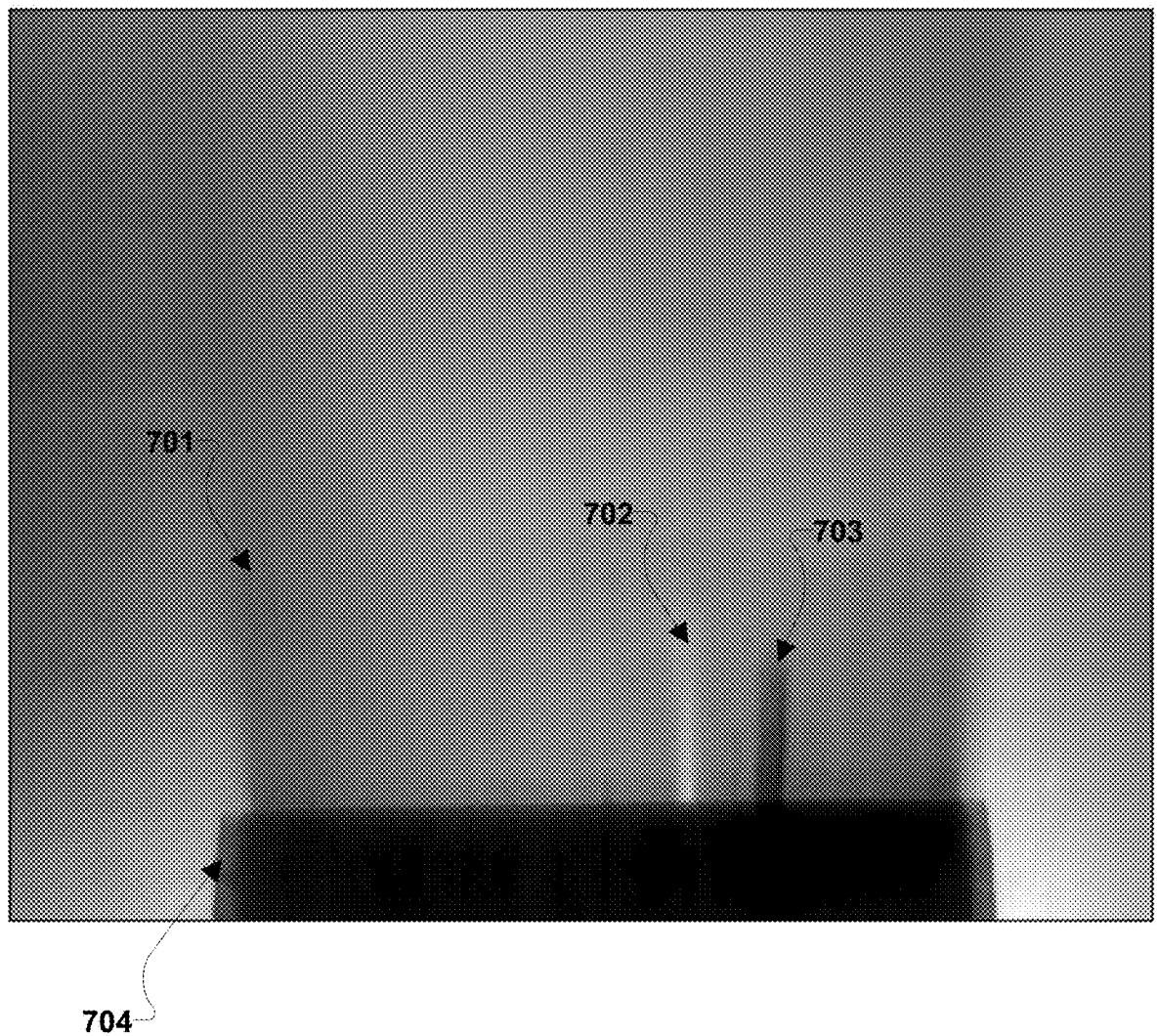
FIG. 7 is a thermal image of an overlap and gap defect created during layup in accordance with various embodiments.

FIG. 7 is a thermal image of artificial defects, specifically an overlap defect 703 and gap defect 702, created during layup of a course 701 (e.g., course 121', 205) as imaged by an embodiment of an in situ inspection system (e.g., system 116, 156) according to the present approach. The overlap defect 703 may be an example of overlap defect 453 and the gap defect 702 may be an example of gap defect 451. The course 701 is shown emerging from under a compaction roller 704 and the overlap defect 703 appears as a darker portion of the image compared to the overall course 701, while the gap defect 702 appears as a lighter portion of the image compared to the overall course 701. As the length, width, and location of the overlap defect 703 and gap defect 702 may be known, the overlap defect 703 and gap defect 702 may be used to determine a current precision of the in situ inspection system and/or to calibrate the in situ inspection system.

Figure 8:
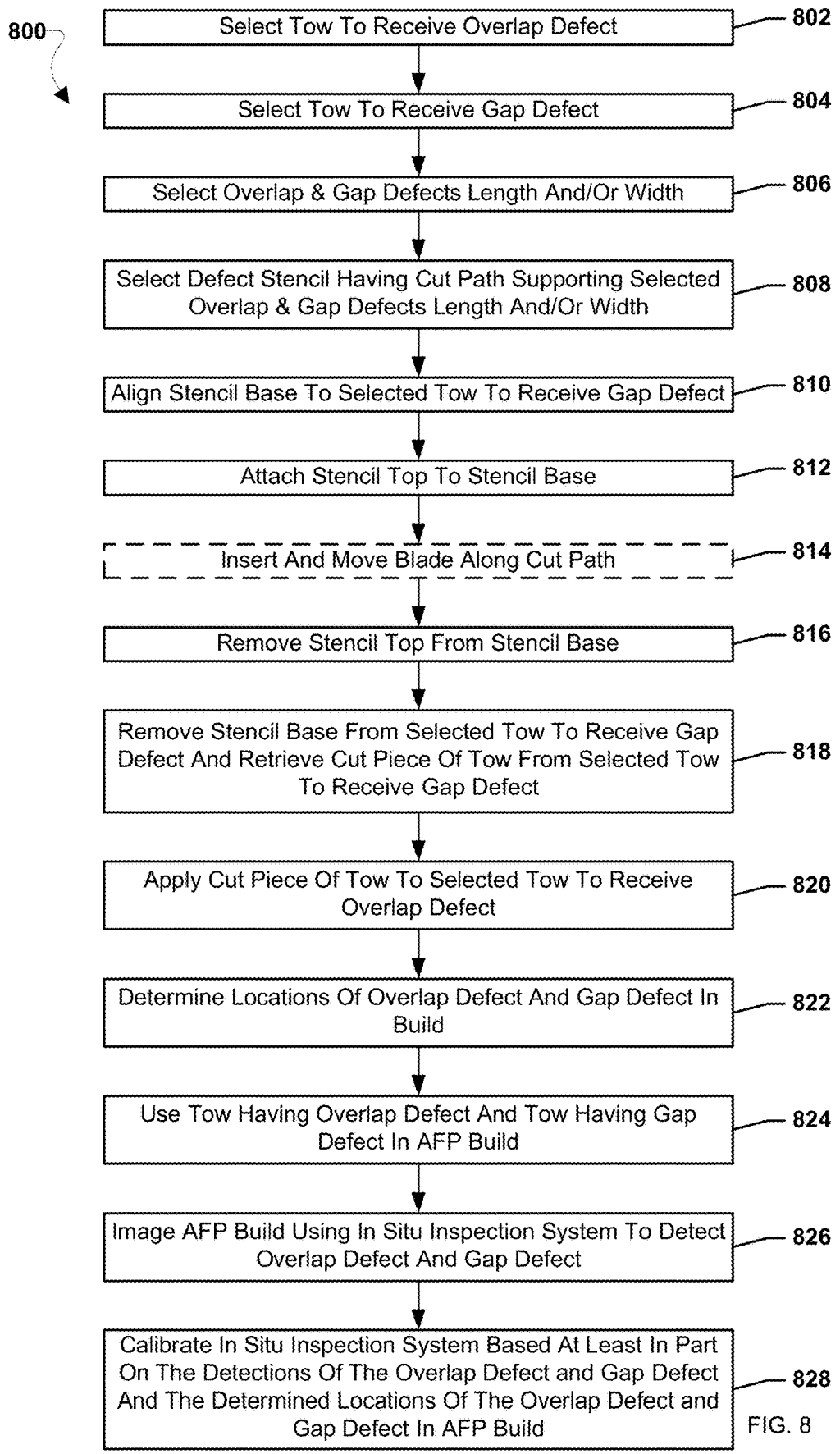
FIG. 8 is a process flow diagram illustrating a method for creating an overlap and gap defect to calibrate an in situ inspection system in accordance with various embodiments.

FIG. 8 is a process flow diagram illustrating a method 800 for creating artificial defects, such as an overlap and gap defect, to calibrate an in situ inspection system for an AFP system, in accordance with various embodiments. Method 800 may be implemented using defect stencils, such as defect stencils 300, 500, etc., described herein and/or AFP systems, such as AFP systems 100, 150, etc., described herein.

In step or operation 802, a tow to receive an overlap defect may be selected. The tow to receive the overlap defect may be a tow of a group of tows that will be aligned side-by-side to form a course.

In step or operation 803, a tow to receive a gap defect may be selected. The tow to receive the gap defect may be a tow of a group of tows that will be aligned side-by-side to form a course.

In operation 806, an overlap and a gap defect length and/or width may be selected. For example, a length and/or width may be selected to create a defect area, whether for the overlap defect or gap defect, having a smallest area detectable by the in situ inspection system. As another example, length and/or width may be selected to create a defect area, whether for the overlap defect or gap defect, having an area corresponding to an acceptable tolerance for a part to be built by an AFP process.

In step or operation 808, a defect stencil having a cut path supporting the selected overlap and the gap defect length and/or width may be selected. For example, considering the defect stencils 300 and 500 described above, a defect stencil having a distance "A" and distance "C" matching (or nearly matching including an offset to account for a blade size) the selected overlap and the gap defect length and/or width may be selected from a plurality of available defect stencils.

In step or operation 810, the stencil base may be aligned to the selected tow to receive the gap defect. For example, the stencil base may be aligned as discussed with reference to FIGS. 4A and 4B. The stencil base may be aligned to the tow in an AFP head (e.g., AFP head 106) of an AFP system or outside the AFP head.

In step or operation 812, the stencil top may be attached to the stencil base. For example, the stencil top may be attached to the stencil base as discussed with reference to FIGS. 4C and 6. When the stencil top, such as stencil top 502, includes blades, such as blades 506, therein, the attachment of the stencil top to the stencil base may cut the tow.

In implementing step or operation 814, a blade may be inserted and moved along a cut path of the defect stencil. For example, blade 410 may be moved along a cut path corresponding to the openings 306 and 307 of the defect stencil 300 as described with reference to FIG. 4D. Operation 814 may be optional as some defect stencils, such as defect stencil 500, may include blades, such as blades 506, mounted therein to cut the tow when the stencil top is attached to the stencil base.

In step or operation 816, the stencil top may be removed from the stencil base. Removing the stencil top may expose the tow and the cut portion of the tow as illustrated in FIG. 4E.

In step or operation 818, the stencil base may be removed from the selected tow to receive the gap defect and the cut piece of tow may be retrieved from the selected tow to receive the gap defect. For example, the cut piece of tow (e.g., portion 450) may be removed from the tow leaving a gap defect in the tow (e.g., gap defect 451).

In step or operation 820, the cut piece of tow may be applied to the selected tow to receive the overlap defect. For example, the cut piece of tow (e.g., portion 450) may be applied to the tow selected for the overlap defect (e.g., overlap defect 453).

In step or operation 822, the locations of the overlap defect and gap defect in the build may be determined. For example, the distance for the point of the tow in the course as it is applied to the build at a compaction roller to the start of the overlap defect and/or the gap defect may be measured. That distance along the tow may be translated into a position in the build based on the speed of deposition, movement rate of the AFP head, and/or lay down rate of the course.

In step or operation 824, the tow having the overlap defect and the tow having the gap defect may be used in the AFP build process. In this manner, the overlap defect and the gap defect may be placed into their determined locations in the build.

In step or operation 826, the AFP build may be imaged using the in situ inspection system to detect the overlap defect and the gap defect. For example, the in situ inspection system may generate thermal images of the build (e.g., using thermal imagers of the in situ inspection system), and a computing device associated with the in situ inspection system (e.g., controller 107 of the AFP system 100, controller 157 of the in situ inspection system 156, and/or computing device 105) may perform operations to detect the overlap defect and the gap defect based on the thermal images. The in situ inspection system may determine the presence or absence of defects, such as gap defects and/or overlap defects, in various manners. For example, the in situ inspection system may compare the pixel intensity in thermal images at different points in a course to one another to identify pixels outside an average pixel intensity and map those pixels as defects. As another example, the in situ inspection system may compare the pixel intensity in thermal images at different points in a course to one or more thresholds to determine whether the pixel intensities at or above and/or at or below thresholds to detect defects in the course. The pixel intensity values may also enable the type of the defect to be determined, as overlap defects and gap defects may be associated with different pixel intensity values. In various embodiments, detecting the overlap defect and the gap defect may include the in situ inspection system determining an estimated location of the detected defects in the build. While discussed as detecting the overlap defect and the gap defect, when the in situ inspection system is not calibrated to have a precision needed to detect the gap defect and/or overlap defect, the gap defect and/or overlap defect may not be detected and/or may be detected in an erroneous estimated location.

In calibrating step or operation 828, the in situ inspection system may be calibrated based at least in part on the detections of the overlap defect and the gap defect and the determined locations of the overlap defect and gap defect in the AFP build. For example, if the in situ inspection system did not detect the overlap defect and/or the gap defect, the resolution on the in situ inspection system may be adjusted to enable the overlap defect and/or the gap defect to be detected. For example, the in situ inspection system's estimated location may be compared to the determined location for the overlap defect and/or the gap defect. When there is a difference between the estimated location and the determined location (i.e., the actual location at which the gap and/or overlap that were created occurred in the build) the in situ inspection system may be adjusted such that the estimated location and the determined location will match. When there is no difference (or a difference within an acceptable tolerance) between the estimated location and the determined location of the gap and/or overlap defects, the in situ inspection system may be considered calibrated. In performing the operations of method 800, should the in situ inspection system be considered calibrated, the AFP system and its in situ inspection system may continue to build a part via the AFP process. Similarly, should further calibration be required, operations of method 800 may be repeated to further calibrate the in situ inspection system. Additionally, while method 800 is discussed in terms of calibration, the method may similarly be used simply to bench mark a precision capability of an in situ inspection system by performing operations 802-826 with smaller gap defects and/or smaller overlap defects until a smallest detectable gap defect and/or smallest detectable overlap defect is detected.

Figure 9:
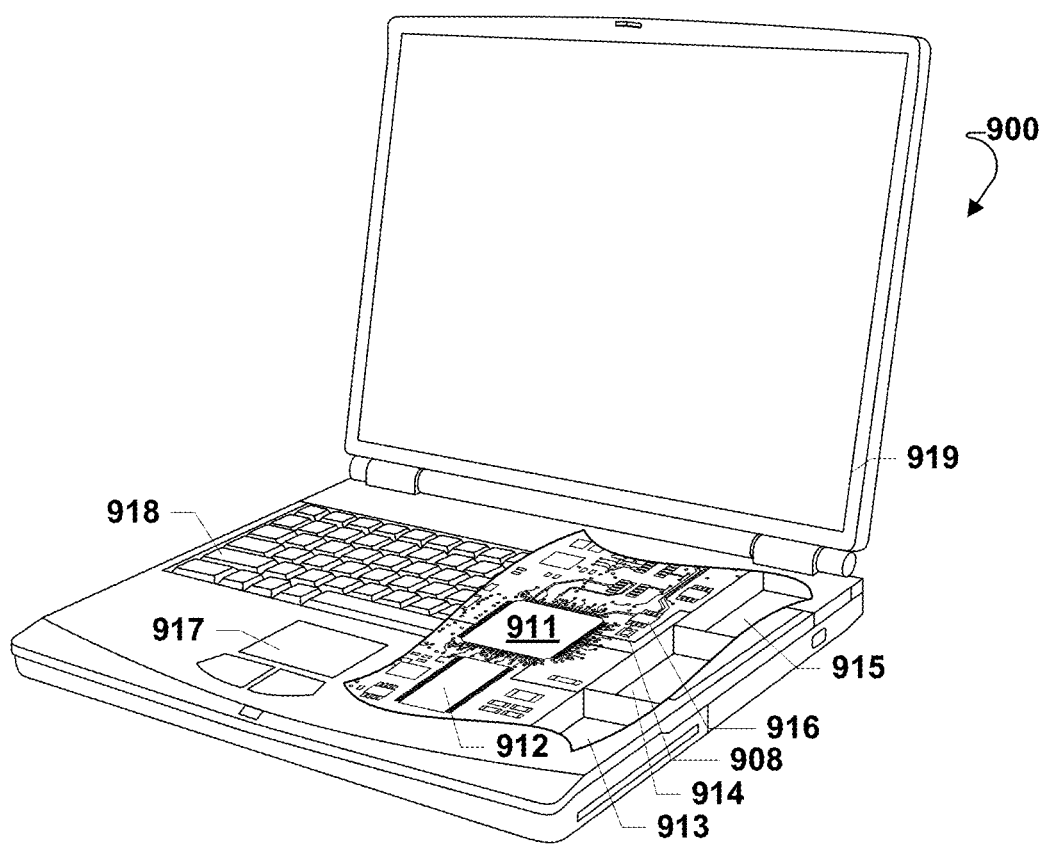
FIG. 9 is a component block diagram of a laptop that is a computing device suitable for use in the various embodiments.

The various embodiments described above may also be implemented within a variety of computing devices, such as a laptop computer 900 illustrated in FIG. 9. For example, the laptop computer 900 may be an example of computing device 105. Many laptop computers include a touchpad 917 with touch surface that serves as the computer's pointing device, and thus may receive drag, scroll, and flick gestures similar to those implemented on mobile computing devices equipped with a touch screen display and described above. A laptop computer 900 will typically include a processor 911 coupled to volatile memory 912 and a large capacity non-volatile memory, such as a disk drive 913 of Flash memory. Additionally, the laptop computer 900 may have one or more antennas 908 for sending and receiving electromagnetic radiation that may be connected to a wireless data link and/or cellular telephone transceiver 916 coupled to the processor 911. The laptop computer 900 may also include a floppy disc drive 914 and a compact disc (CD) drive 915 coupled to the processor 911. In a notebook configuration, the computer housing includes the touchpad 917, the keyboard 918, and the display 919 all coupled to the processor 911. Other configurations of the mobile computing device may include a computer mouse or trackball coupled to the processor (e.g., via a USB input) as are well known, which may also be used in conjunction with the various embodiments.

The processors described herein may be any programmable microprocessor, microcomputer or multiple processor chip or chips that can be configured by software instructions (applications) to perform a variety of functions, including the functions of the various embodiments described above. In some embodiments, multiple processors may be provided, such as one processor dedicated to wireless communication functions and one processor dedicated to running other applications. Typically, software applications may be stored in the internal memory before they are accessed and loaded into the processor. The processor may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein

What is claimed is:

1. A method for creating artificial defects in a tow, the artificial defects supporting calibration of an in situ inspection system of an Automated Fiber Placement (AFP) system, the method comprising:
    selecting a length and a width of an artificial defect;
    selecting a defect stencil having a cut path corresponding to the selected length and width, the cut path within the defect stencil; and
    creating the artificial defect in a tow to be deposited in a course by an AFP head of the AFP system, wherein creating the artificial defect comprises cutting a portion of tow material using the selected defect stencil before the tow is aligned by the AFP head to form the course.

2. The method of claim 1, wherein the artificial defect is a gap defect or an overlap defect.

3. The method of claim 1, wherein the defect stencil is a two part defect stencil having a stencil top and a stencil base configured such that when placed on one another the tow material is held in place.

4. The method of claim 3, wherein cutting a portion of tow material using the selected defect stencil comprises passing a blade through an opening in the stencil top.

5. The method of claim 3, wherein cutting a portion of tow material using the selected defect stencil comprises pressing a blade disposed in the stencil top through the tow material when the stencil top and the stencil base are placed on one another.

6. The method of claim 1, wherein creating the artificial defect further comprises cutting the portion of tow material using the selected defect stencil within the AFP head.

7. A method for creating artificial defects in a tow, the artificial defects supporting calibration of an in situ inspection system of an Automated Fiber Placement (AFP) system, the method comprising:
   selecting a length and a width of an artificial defect, wherein selecting the length and the width of the artificial defect comprises selecting the length and the width of a gap defect and an overlap defect;
   selecting a defect stencil having a cut path corresponding to the selected length and width; and
   creating the artificial defect in a tow to be deposited in a course by the AFP system, wherein creating the artificial defect comprises cutting a portion of tow material using the selected defect stencil, wherein cutting the portion of tow material using the selected defect stencil comprises cutting a portion of a first tow of the course selected to receive the gap defect using the selected defect stencil, and wherein creating the artificial defect further comprises applying the portion of the first tow to a second tow of the course to create the overlap defect.

8. The method of claim 7, further comprising:
   depositing the first tow of the course and the second tow of the course by the AFP system to create an AFP build having the gap defect and the overlap defect; and
   imaging the AFP build using the in situ inspection system to detect the gap defect and the overlap defect.

9. The method of claim 8, further comprising:
   calibrating the in situ inspection system based at least in part on the detections of the gap defect and the overlap defect.

10. The method of claim 8, wherein the defect stencil is a two part defect stencil having a stencil top and a stencil base configured such that when placed on one another the first tow is held in place between the stencil top and the stencil base.

11. The method of claim 10, wherein the stencil top and the stencil base have openings therein configured to form a cut path corresponding to the selected length and width.

12. The method of claim 10, wherein the stencil top includes one or more blades therein configured to cut the first tow.

13. A defect stencil for creating artificial defects in a tow, the artificial defects supporting calibration of an in situ inspection system for an Automated Fiber Placement (AFP) system, the stencil comprising:
   a stencil top; and
   a stencil base having a first opening extending a depth below a surface of the stencil base and forming a cut path within the stencil base,
   wherein the stencil top and the stencil base are configured such that, when placed on one another with a tow of the AFP system in between the stencil top and the stencil base and contacting the surface of the stencil base, the stencil top and the stencil base hold the tow in place therebetween while the tow is cut along the cut path.

14. The defect stencil of claim 13, wherein the stencil top has a second opening, the second opening configured to:
   align with the first opening when the stencil top and the stencil base are placed on one another; and
   receive a blade through the second opening to cut the tow along the cut path.

15. The defect stencil of claim 13, wherein the stencil top has one or more blades disposed therein, the one or more blades configured to align with the first opening and cut the tow along the cut path when the stencil top and the stencil base are placed on one another.

16. The defect stencil of claim 13, wherein:
   the stencil base further comprises a tow support protruding from the surface of the stencil base; and
   a width of the stencil base is greater than a width of the cut path.

17. The defect stencil of claim 16, wherein the stencil top further comprises a tow gap configured to receive the tow support when the stencil top and the stencil base are placed on one another.

18. The defect stencil of claim 17, wherein the stencil base comprises alignment protrusions configured to interact with sides of the stencil base when the stencil top and the stencil base are placed on one another.

19. The defect stencil of claim 18, wherein the stencil top and the stencil base are formed of plastic.

20. The defect stencil of claim 13, wherein the cut path extends a first distance toward a center of the stencil base and a second distance along a length of the stencil such that the cut path is configured to form a rectangle cut of the tow.

* * * * *